US011962924B2

(12) United States Patent
Ion et al.

(10) Patent No.: US 11,962,924 B2
(45) Date of Patent: *Apr. 16, 2024

(54) SMART SENSOR WITH REGION OF INTEREST CAPABILITIES

(71) Applicant: Waymo LLC, Mountain View, CA (US)

(72) Inventors: Lucian Ion, Santa Clara, CA (US); Nirav Dharia, Milpitas, CA (US); Vlad Cardei, Redwood City, CA (US)

(73) Assignee: Waymo, LLC, Mountain View, CA (US)

( * ) Notice: Subject to any disclaimer, the term of this patent is extended or adjusted under 35 U.S.C. 154(b) by 120 days.

This patent is subject to a terminal disclaimer.

(21) Appl. No.: 17/655,411

(22) Filed: Mar. 18, 2022

(65) Prior Publication Data

US 2022/0210363 A1 Jun. 30, 2022

Related U.S. Application Data

(63) Continuation of application No. 16/808,268, filed on Mar. 3, 2020, now Pat. No. 11,310,451.
(Continued)

(51) Int. Cl.
*H04N 25/71* (2023.01)
*H04N 25/713* (2023.01)

(52) U.S. Cl.
CPC .................. *H04N 25/713* (2023.01)

(58) Field of Classification Search
CPC .................................................. H04N 25/713
See application file for complete search history.

(56) References Cited

U.S. PATENT DOCUMENTS 4,175,860 A 11/1979 Bacus
4,692,806 A 9/1987 Anderson et al.
(Continued)

FOREIGN PATENT DOCUMENTS

CN 106599828 4/2017
GB 2298538 9/1996
(Continued)

OTHER PUBLICATIONS

Horaud et al., "An Overview of Depth Cameras and Range Scanners Based on Time-of-Flight Technologies," Machine Vision and Applications, 2016, pp. 1005-1020, vol. 27, No. 7.
(Continued)

*Primary Examiner* — Twyler L Haskins
*Assistant Examiner* — Fayez A Bhuiyan
(74) *Attorney, Agent, or Firm* — McDonnell Boehnen Hulbert & Berghoff LLP

(57) ABSTRACT

An apparatus includes an image sensor having a plurality of pixels that form regions of interest (ROIs), analog-to-digital converter (ADC) banks, and multiplexers. Each respective multiplexer is electrically connected to (i) a corresponding ADC bank and (ii) a corresponding subset of the ROIs. The apparatus also includes control circuitry configured to obtain a full-resolution image of an environment by electrically connecting, by way of the multiplexers, each respective ADC bank to the associated respective ROI. The control circuitry is also configured to select a particular ROI based on the full-resolution image and obtain a plurality of ROI images of the particular ROI by (i) electrically connecting, to the particular ROI, a first ADC bank associated with the particular ROI and a second ADC bank associated with another ROI and (ii) digitizing pixels of the particular ROI by way of parallel operation of the first and second ADC banks.

20 Claims, 10 Drawing Sheets

Related U.S. Application Data

(60) Provisional application No. 62/896,387, filed on Sep. 5, 2019.

(56) References Cited

U.S. PATENT DOCUMENTS

| | | | |
|---|---|---|---|
| 5,262,871 A | 11/1993 | Wilder et al. | |
| 5,988,862 A | 11/1999 | Kacyra et al. | |
| 6,320,618 B1 | 11/2001 | Aoyama | |
| 6,466,265 B1 | 10/2002 | Lee et al. | |
| 6,473,122 B1 | 10/2002 | Kanekal | |
| 7,129,978 B1 | 10/2006 | Brehmer et al. | |
| 7,227,116 B2 | 6/2007 | Glecker | |
| 7,459,663 B2 | 12/2008 | Raynor | |
| 7,728,900 B2 | 6/2010 | Fukushima et al. | |
| 8,027,029 B2 | 9/2011 | Lu et al. | |
| 8,064,643 B2 | 11/2011 | Stein et al. | |
| 8,085,922 B1 | 12/2011 | Smith et al. | |
| 8,477,190 B2 | 7/2013 | Giuffrida et al. | |
| 8,809,759 B2 | 8/2014 | Mo et al. | |
| 8,855,849 B1 | 10/2014 | Ferguson et al. | |
| 8,866,943 B2 | 10/2014 | Park et al. | |
| 9,092,841 B2 | 7/2015 | Silver | |
| 9,145,139 B2 | 9/2015 | Ferguson et al. | |
| 9,157,988 B2 | 10/2015 | Cho et al. | |
| 9,224,053 B1 | 12/2015 | Ferguson et al. | |
| 9,237,286 B2 | 1/2016 | Theuwissen | |
| 9,285,893 B2 | 3/2016 | Holz | |
| 9,288,402 B2 | 3/2016 | Moldovan et al. | |
| 9,440,535 B2 | 9/2016 | Schofield | |
| 9,467,638 B2 | 10/2016 | Chen et al. | |
| 9,508,014 B2 | 11/2016 | Lu et al. | |
| 9,537,501 B2 | 1/2017 | Lee et al. | |
| 9,578,234 B2 | 2/2017 | Tran | |
| 9,584,745 B2 | 2/2017 | Ladd | |
| 9,720,412 B1 | 8/2017 | Zhu et al. | |
| 9,983,590 B2 | 5/2018 | Templeton et al. | |
| 10,018,609 B2 | 7/2018 | Miller et al. | |
| 10,104,318 B2 | 10/2018 | Smith et al. | |
| 10,181,084 B2 | 1/2019 | Ferguson et al. | |
| 10,191,155 B2 | 1/2019 | Curatu | |
| 10,248,874 B2 | 4/2019 | Mossaei et al. | |
| 10,345,447 B1 | 7/2019 | Hicks | |
| 10,440,293 B1 | 10/2019 | Ihns | |
| 10,447,966 B2 | 10/2019 | Ritchey et al. | |
| 10,466,712 B2 | 11/2019 | Ferguson et al. | |
| 11,252,366 B2 | 2/2022 | Dharia et al. | |
| 11,284,021 B1 | 3/2022 | Dharia et al. | |
| 11,310,451 B1 * | 4/2022 | Lon | H04N 25/443 |
| 11,428,550 B2 | 8/2022 | Dharia et al. | |
| 2004/0085443 A1 | 5/2004 | Kallioniemi et al. | |
| 2004/0190092 A1 | 9/2004 | Silverbrook et al. | |
| 2008/0243439 A1 | 10/2008 | Runkle et al. | |
| 2008/0291304 A1 | 11/2008 | Ota et al. | |
| 2011/0063446 A1 | 3/2011 | McMordie et al. | |
| 2012/0053755 A1 | 3/2012 | Takagi | |
| 2012/0268727 A1 | 10/2012 | Schrey et al. | |
| 2014/0368702 A1 | 12/2014 | Kuroda | |
| 2015/0169964 A1 | 6/2015 | Finn et al. | |
| 2016/0021302 A1 | 1/2016 | Cho et al. | |
| 2016/0275642 A1 | 9/2016 | Abeykoon et al. | |
| 2016/0323524 A1 | 11/2016 | Smith et al. | |
| 2016/0337608 A1 | 11/2016 | Numata | |
| 2017/0195596 A1 | 7/2017 | Vogelsang et al. | |
| 2017/0269198 A1 | 9/2017 | Hall et al. | |
| 2018/0132726 A1 | 5/2018 | Dickie et al. | |
| 2018/0189574 A1 | 7/2018 | Brueckner et al. | |
| 2018/0211128 A1 | 7/2018 | Hotson et al. | |
| 2018/0299534 A1 | 10/2018 | LaChapelle et al. | |
| 2018/0308202 A1 | 10/2018 | Appu et al. | |
| 2019/0004534 A1 | 1/2019 | Huang et al. | |
| 2019/0035154 A1 | 1/2019 | Liu | |
| 2019/0042860 A1 | 2/2019 | Lee et al. | |
| 2019/0079193 A1 | 3/2019 | Gunnam | |
| 2019/0081100 A1 | 3/2019 | Matsumoto et al. | |
| 2019/0087198 A1 | 3/2019 | Frascati et al. | |
| 2019/0095721 A1 | 3/2019 | Ion et al. | |
| 2019/0098233 A1 | 3/2019 | Gassend et al. | |
| 2019/0108410 A1 | 4/2019 | Zhang | |
| 2019/0135196 A1 | 5/2019 | Vaid et al. | |
| 2019/0178974 A1 | 6/2019 | Droz | |
| 2019/0180133 A1 | 6/2019 | Shannon et al. | |
| 2019/0217791 A1 | 7/2019 | Bradley et al. | |
| 2019/0220013 A1 | 7/2019 | Bradley et al. | |
| 2019/0220014 A1 | 7/2019 | Bradley et al. | |
| 2019/0260385 A1 | 8/2019 | Niwa | |
| 2019/0266418 A1 | 8/2019 | Xu et al. | |
| 2019/0271767 A1 | 9/2019 | Keilaf et al. | |
| 2019/0311546 A1 | 10/2019 | Tay et al. | |
| 2019/0317193 A9 | 10/2019 | O'Keefe | |
| 2020/0103507 A1 | 4/2020 | Kirillov et al. | |
| 2020/0125890 A1 | 4/2020 | Donahue et al. | |
| 2020/0174107 A1 | 6/2020 | Briggs et al. | |
| 2020/0320677 A1 | 10/2020 | Ion et al. | |
| 2021/0072398 A1 | 3/2021 | Matsunaga | |
| 2021/0114616 A1 | 4/2021 | Altman | |
| 2021/0152769 A1 | 5/2021 | Dharia et al. | |
| 2021/0278257 A1 | 9/2021 | Dharia et al. | |
| 2022/0076032 A1 | 3/2022 | Jain et al. | |
| 2022/0188560 A1 | 6/2022 | Dharia et al. | |

FOREIGN PATENT DOCUMENTS

| | | |
|---|---|---|
| JP | 5852706 | 10/2014 |
| KR | 101899549 | 9/2018 |
| KR | 102043922 | 12/2019 |
| WO | 2015/046735 | 3/2019 |

OTHER PUBLICATIONS

Dinh et al., "High Resolution Face Sequences from a PTZ Network Camera," 2011 IEEE International Conference on Automatic Face and Gesture Recognition (FG), May 19, 2011.

International Searching Authority, International Search Report and Written Opinion dated Mar. 16, 2021, issued in connection with International Patent Application No. PCT/US2020/060960 filed on Nov. 18, 2020, 9 pages.

International Searching Authority, International Search Report and Written Opinion dated Mar. 22, 2022, issued in connection with International Patent Application No. PCT/US2021/072721, filed Dec. 3, 2021, 8 pages.

Puletic, Dusan, "Generating and Visualizing Summarizations of Surveillance Videos," Thesis submitted to George Mason University, 2012, 55 pages.

Quaritsch et al., "Autonomous Multicamera Tracking on Embedded Smart Cameras," EURASIP Journal on Embedded Systems, vol. 2007, Article ID 92827, Published Jan. 2007, 10 pages.

Wang et al., "Cooperative Object Tracking and Composite Event Detection With Wireless Embedded Smart Cameras," IEEE Transactions on Image Processing, vol. 19, No. 10, Published Jun. 14, 2010, 20 pages.

\* cited by examiner

500 — OBTAIN, FROM AN IMAGE SENSOR COMPRISING A PLURALITY OF PIXELS THAT FORM A PLURALITY OF REGIONS OF INTEREST (ROIS), A FULL-RESOLUTION IMAGE OF AN ENVIRONMENT, WHEREIN THE FULL-RESOLUTION IMAGE CONTAINS EACH RESPECTIVE ROI OF THE PLURALITY OF ROIS, WHEREIN EACH RESPECTIVE ROI OF THE PLURALITY OF ROIS IS ASSOCIATED WITH A RESPECTIVE ADC BANK OF A PLURALITY OF ADC BANKS, WHEREIN EACH RESPECTIVE MULTIPLEXER OF A PLURALITY OF MULTIPLEXERS IS ELECTRICALLY CONNECTED TO (I) A CORRESPONDING ADC BANK OF THE PLURALITY OF ADC BANKS AND (II) A CORRESPONDING SUBSET OF THE PLURALITY OF ROIS, WHEREIN THE RESPECTIVE MULTIPLEXER IS CONFIGURED TO ELECTRICALLY CONNECT THE CORRESPONDING ADC BANK TO A SELECTED ROI OF THE SUBSET, AND WHEREIN OBTAINING THE FULL-RESOLUTION IMAGE COMPRISES ELECTRICALLY CONNECTING, BY WAY OF THE PLURALITY OF MULTIPLEXERS, EACH RESPECTIVE ADC BANK TO THE ASSOCIATED RESPECTIVE ROI

502 — SELECTING A PARTICULAR ROI BASED ON THE FULL-RESOLUTION IMAGE

504 — OBTAINING, FROM THE IMAGE SENSOR, A PLURALITY OF ROI IMAGES OF THE PARTICULAR ROI INSTEAD OF OBTAINING AN ADDITIONAL FULL-RESOLUTION IMAGE BY (I) ELECTRICALLY CONNECTING, TO THE PARTICULAR ROI AND BY WAY OF THE RESPECTIVE MULTIPLEXERS, A FIRST ADC BANK ASSOCIATED WITH THE PARTICULAR ROI AND A SECOND ADC BANK ASSOCIATED WITH ANOTHER ROI OF THE PLURALITY OF ROIS AND (II) DIGITIZING PIXELS OF THE PARTICULAR ROI BY WAY OF PARALLEL OPERATION OF THE FIRST ADC BANK AND THE SECOND ADC BANK

Figure 5

SMART SENSOR WITH REGION OF INTEREST CAPABILITIES

CROSS-REFERENCE TO RELATED APPLICATIONS

This application is a continuation of and claims priority to U.S. patent application Ser. No. 16/808,268, filed Mar. 3, 2020, and titled "Smart Sensor with Region of Interest Capabilities," which claims priority to U.S. Provisional Patent Application No. 62/896,387, filed on Sep. 5, 2019, and titled "Smart Sensor with Region of Interest Capabilities," each of which is hereby incorporated by reference as if fully set forth in this description.

BACKGROUND

An image sensor includes a plurality of light-sensing pixels that measure an intensity of light incident thereon and thereby collectively capture an image of an environment. A Bayer filter may be applied to the image sensor to allow the image sensor to generate color images of the environment. Image sensors may be used in a plurality of applications such as photography, robotics, and autonomous vehicles.

SUMMARY

An image sensor may contain a plurality of regions of interest (ROIs), each of which may be read out independently of the other ROIs. The image sensor may be used to capture a full-resolution image that includes each of the ROIs. Based on the content of the full-resolution image, an ROI may be selected from which ROI images are to be acquired. These ROI images may be acquired at a higher frame rate than the full-resolution image. Specifically, in order to capture the ROI images at the higher frame rate, analog-to-digital converters (ADCs) may be reassigned, by way of multiplexers, to the selected ROI from the other ROIs. Thus, ADCs that would otherwise be used to digitize pixels of the other ROIs may be used in combination with the ADC assigned to the selected ROI to digitize pixels of the selected ROI. Each of these ADCs may operate to digitize multiple rows or columns of the ROI in parallel. For example, four different ADC banks may, in parallel, read out four different columns of the selected ROI.

In a first example embodiment, an apparatus is provided that includes an image sensor having a plurality of pixels that form a plurality of ROIs. The apparatus also includes a plurality of analog-to-digital converter (ADC) banks. Each respective ADC bank of the plurality of ADC banks is associated with a respective ROI of the plurality of ROIs. The apparatus additionally includes a plurality of multiplexers. Each respective multiplexer of the plurality of multiplexers is electrically connected to (i) a corresponding ADC bank of the plurality of ADC banks and (ii) a corresponding subset of the plurality of ROIs. The respective multiplexer is configured to electrically connect the corresponding ADC bank to a selected ROI of the subset. The apparatus further includes control circuitry configured to perform operations that include obtaining, from the image sensor, a full-resolution image of an environment by electrically connecting, by way of the plurality of multiplexers, each respective ADC bank to the associated respective ROI. The full-resolution image contains each respective ROI of the plurality of ROIs. The operations also include selecting a particular ROI based on the full-resolution image. The operations further include obtaining, from the image sensor, a plurality of ROI images of the particular ROI instead of obtaining an additional full-resolution image by (i) electrically connecting, to the particular ROI and by way of the respective multiplexers, a first ADC bank associated with the particular ROI and a second ADC bank associated with another ROI of the plurality of ROIs and (ii) digitizing pixels of the particular ROI by way of parallel operation of the first ADC bank and the second ADC bank.

In a second example embodiment, a method is provided that includes obtaining, from an image sensor having a plurality of pixels forming a plurality of ROIs, a full-resolution image of an environment. The full-resolution image contains each respective ROI of the plurality of ROIs. Each respective ROI of the plurality of ROIs is associated with a respective ADC bank of a plurality of ADC banks. Each respective multiplexer of a plurality of multiplexers is electrically connected to (i) a corresponding ADC bank of the plurality of ADC banks and (ii) a corresponding subset of the plurality of ROIs. The respective multiplexer is configured to electrically connect the corresponding ADC bank to a selected ROI of the subset. Obtaining the full-resolution image includes electrically connecting, by way of the plurality of multiplexers, each respective ADC bank to the associated respective ROI. The method also includes selecting a particular ROI based on the full-resolution image. The method further includes obtaining, from the image sensor, a plurality of ROI images of the particular ROI instead of obtaining an additional full-resolution image by (i) electrically connecting, to the particular ROI and by way of the respective multiplexers, a first ADC bank associated with the particular ROI and a second ADC bank associated with another ROI of the plurality of ROIs and (ii) digitizing pixels of the particular ROI by way of parallel operation of the first ADC bank and the second ADC bank.

In a third example embodiment a non-transitory computer readable storage medium is provided having stored thereon instructions that, when executed by a computing device, cause the computing device to perform operations. The operations include obtaining, from an image sensor comprising a plurality of pixels that form a plurality of ROIs, a full-resolution image of an environment. The full-resolution image contains each respective ROI of the plurality of ROIs. Each respective ROI of the plurality of ROIs is associated with a respective ADC bank of a plurality of ADC banks. Each respective multiplexer of a plurality of multiplexers is electrically connected to (i) a corresponding ADC bank of the plurality of ADC banks and (ii) a corresponding subset of the plurality of ROIs. The respective multiplexer is configured to electrically connect the corresponding ADC bank to a selected ROI of the subset. Obtaining the full-resolution image includes electrically connecting, by way of the plurality of multiplexers, each respective ADC bank to the associated respective ROI. The operations also include selecting a particular ROI based on the full-resolution image. The operations further include obtaining, from the image sensor, a plurality of ROI images of the particular ROI instead of obtaining an additional full-resolution image by (i) electrically connecting, to the particular ROI and by way of the respective multiplexers, a first ADC bank associated with the particular ROI and a second ADC bank associated with another ROI of the plurality of ROIs and (ii) digitizing pixels of the particular ROI by way of parallel operation of the first ADC bank and the second ADC bank.

In a fourth example embodiment, a system is provided that includes image capture means having a plurality of pixel means that form a plurality of ROIs. The system also includes a plurality of banks of means for converting analog signals to digital signals. Each respective bank of the plurality of banks is associated with a respective ROI of the plurality of ROIs. The system additionally includes a plurality of multiplexing means. Each respective multiplexing means of the plurality of multiplexing means is electrically connected to (i) a corresponding bank of the plurality of banks and (ii) a corresponding subset of the plurality of ROIs. The respective multiplexing means is configured to electrically connect the corresponding bank to a selected ROI of the subset. The system further includes means for obtaining, from the image capture means, a full-resolution image of an environment by electrically connecting, by way of the plurality of multiplexing means, each respective bank to the associated respective ROI. The full-resolution image contains each respective ROI of the plurality of ROIs. The system yet further includes means for selecting a particular ROI based on the full-resolution image. The system yet additionally includes means for obtaining, from the image capture means, a plurality of ROI images of the particular ROI instead of obtaining an additional full-resolution image by (i) electrically connecting, to the particular ROI and by way of the respective multiplexing means, a first bank associated with the particular ROI and a second bank associated with another ROI of the plurality of ROIs and (ii) digitizing pixels of the particular ROI by way of parallel operation of the first bank and the second bank.

These, as well as other embodiments, aspects, advantages, and alternatives, will become apparent to those of ordinary skill in the art by reading the following detailed description, with reference where appropriate to the accompanying drawings. Further, this summary and other descriptions and figures provided herein are intended to illustrate embodiments by way of example only and, as such, that numerous variations are possible. For instance, structural elements and process steps can be rearranged, combined, distributed, eliminated, or otherwise changed, while remaining within the scope of the embodiments as claimed.

BRIEF DESCRIPTION OF THE DRAWINGS

FIG. 5 illustrates a flow chart, in accordance with example embodiments.

DETAILED DESCRIPTION

Figure 1:
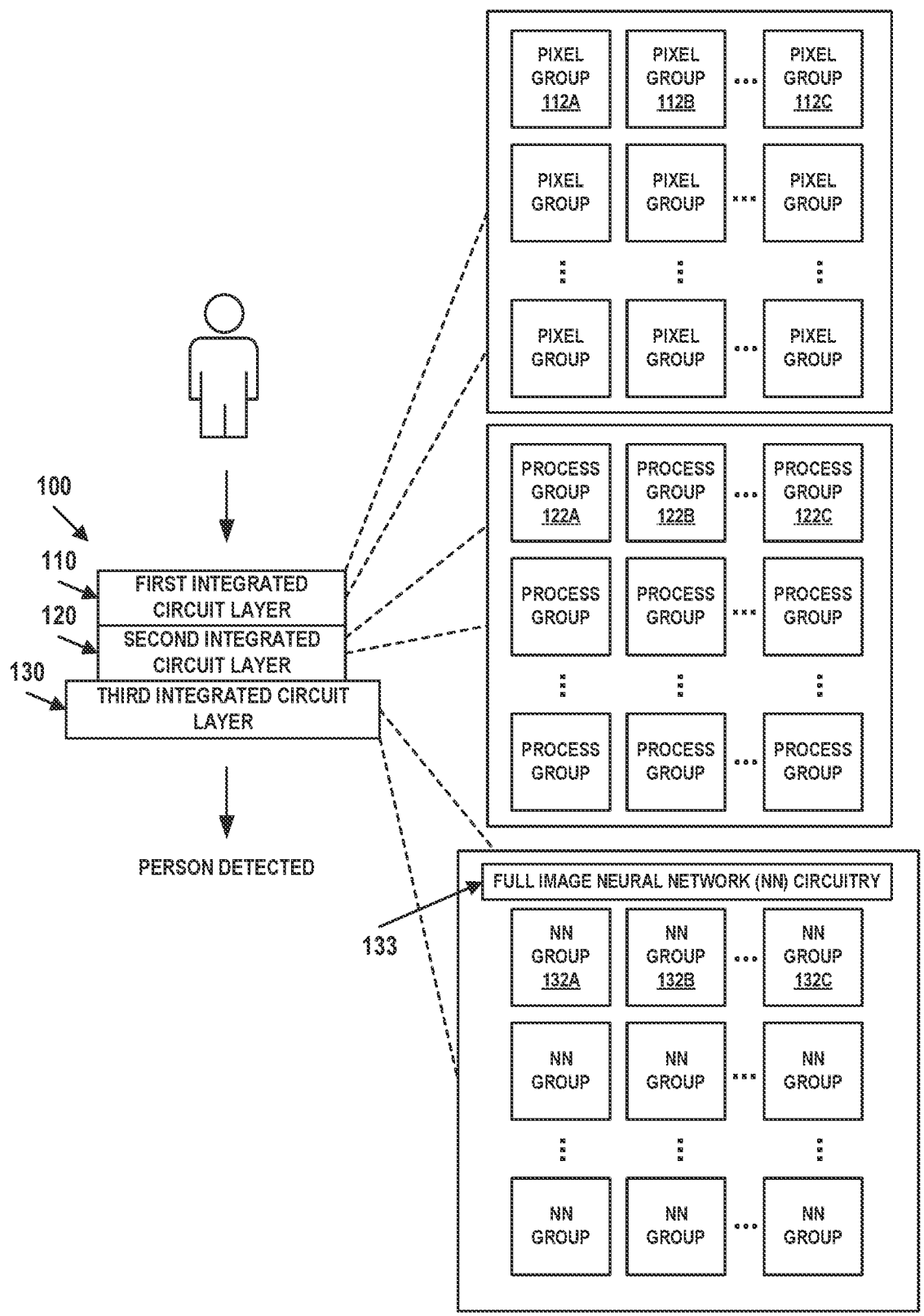
FIG. 1 illustrates a block diagram of an image sensor with three integrated circuit layers, in accordance with example embodiments.

Example methods, devices, and systems are described herein. It should be understood that the words "example" and "exemplary" are used herein to mean "serving as an example, instance, or illustration." Any embodiment or feature described herein as being an "example," "exemplary," and/or "illustrative" is not necessarily to be construed as preferred or advantageous over other embodiments or features unless stated as such. Thus, other embodiments can be utilized and other changes can be made without departing from the scope of the subject matter presented herein.

Accordingly, the example embodiments described herein are not meant to be limiting. It will be readily understood that the aspects of the present disclosure, as generally described herein, and illustrated in the figures, can be arranged, substituted, combined, separated, and designed in a wide variety of different configurations.

Further, unless context suggests otherwise, the features illustrated in each of the figures may be used in combination with one another. Thus, the figures should be generally viewed as component aspects of one or more overall embodiments, with the understanding that not all illustrated features are necessary for each embodiment.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order. Unless otherwise noted, figures are not drawn to scale.

I. Overview

Image sensors may be provided on an autonomous vehicle to assist with perception of and navigation through the environment. In some cases, these image sensors may be capable of generating more data than can be timely processed by the control system of the autonomous vehicle. This may be the case, for example, when a large number of image sensors is provided on the vehicle and/or when the resolution of each image sensor is high, resulting in generation of a large amount of image data. In some cases, the amount of data transfer bandwidth available on the autonomous vehicle and/or the desired data transfer latency may limit the amount of image data that can be utilized by the control system. In other cases, the amount of processing power provided by the control system may limit the amount of image data that can be processed.

Generating and processing a larger amount of image data may, in general, be desirable as it may allow for detection, tracking, classification, and other analysis of objects within the environment. For example, capturing images at a high frame rate may allow for analysis of fast-moving objects by representing such objects without motion blur. Similarly, capturing high-resolution images may allow for analysis of far-away objects. Notably, in some cases, such objects might be represented in a portion of the entire image generated by an image sensor, rather than taking up the entirety of the image.

Accordingly, an image sensor and corresponding circuitry may be provided that divide the image sensor into a plurality of ROIs and allow for selective readout of image data from individual ROIs. These ROIs may allow the image sensor to accommodate high frame rate and/or high resolution imaging while at the same time reducing the total amount of image data that is generated, transmitted, and analyzed. That is, the image sensor may generate image data in some ROIs (e.g., those that contain therein some object of interest) while other ROIs (e.g., those that do not contain an object of interest) are not used to generate image data.

To that end, the image sensor may alternate between generating full-resolution images (i.e., images containing each of the ROIs) and ROI images that represent one or more of the ROIs, but not all the ROIs. The full-resolution images may be analyzed to detect therein an object of interest, and the ROI in which the object of interest is represented may subsequently be used to generate a plurality of ROI images for further analysis. In one example, one or more full-resolution images may be used to determine a speed of an object of interest. When this speed crosses a threshold speed (e.g., exceeds the threshold speed or falls below the threshold speed), the ROI containing the object may be selected and used to acquire a plurality of ROI images of the object.

In another example, a full-resolution image may be used to determine a distance between the image sensor and an object of interest. When this distance crosses a threshold distance (e.g., exceeds the threshold distance or falls below the threshold distance), the ROI containing the object may be selected and used to acquire a plurality of ROI images of the object. For example, when pedestrians are determined, based on the full-resolution image, to be within the threshold distance of an autonomous vehicle, a plurality of ROI images of the pedestrians may be acquired. An ROI may additionally or alternatively be selected based on a classification of the object in the full-resolution image or other properties of the object or the full-resolution image. For example, ROI images of traffic lights or signals may be acquired based on a classification thereof. These and other attributes of an object of interest in a full-resolution image may be used independently or in combination to select a particular ROI.

Due to their smaller size, the ROI images may be generated, transferred, and analyzed at a higher rate than full-resolution images, thus allowing, for example, the high-speed object and/or the far-away object to be more accurately analyzed (e.g., due to absence of motion blur and availability of redundant high-resolution data). Analysis of the plurality of ROI images may generate one or more attributes of the object of interest. These attributes may include geometric properties of the object of interest, position of the object of interest within the environment, changes in position of the object of interest over time (e.g., velocity, acceleration, trajectory), a classification of the object of interest (e.g., car, pedestrian, vegetation, road, side walk, etc.), or one or more confidence values associated with results of the analyzing of the plurality of ROI images (e.g., confidence level that the object is another car), among other possibilities. The ROI used to generate the ROI images may change over time as new objects of interest are detected within different portions of new full-resolution images.

In some implementations, the ROIs may be fixed with respect to a plurality of pixels that make up the image sensor. For example, the ROIs may divide an area of the image sensor into two columns and four rows, thus forming a total of 8 regions of interest. The ROIs may be arranged in the columns sequentially (i.e., ROIs 0-3 in column 1 and ROIs 4-7 in column 2) or in an alternating manner (i.e., ROIs 0, 2, 4, and 6 in column 1 and ROIs 1, 3, 5, and 7 in column 2). The ROIs may be mutually exclusive or may have some overlapping sections. In other implementations, the ROIs may be reconfigurable. That is, pixels initially assigned to a first ROI may subsequently be reassigned to a different ROI, thus changing the shape and/or size of the ROIs (e.g., to capture the entirety of an object within a single ROI).

Each ROI may be associated with a corresponding analog-to-digital converter (ADC) bank. Each ADC bank may include one or more ADCs. A full-resolution image may be obtained by assigning each ADC bank to its corresponding ROI and using the ADC banks to digitize pixels of the ROIs. In one example, the ADCs may be configured to digitize the pixels of the image sensor in a column-wise direction. Thus, a particular column of each respective ROI (e.g., one column of the full-resolution image) may be digitized by way of the plurality of ADC banks each operating in parallel on their associated ROIs. In another example, the ADCs may be configured to digitize the pixels of the image sensor in a row-wise direction. Thus, a particular row of each respective ROI (e.g., one or more rows of the full-resolution image) may be digitized by way of the plurality of ADC banks each operating in parallel on their associated ROIs.

On the other hand, an ROI image may be obtained by assigning to a particular ROI (i) its associated ADC bank and (ii) one or more other ADC banks of other ROIs that are not being used to generate image data. Each ADC bank may be used to digitize a different column of the ROI in parallel with the other ADC banks. Accordingly, multiple columns of the ROI may be read-out in parallel. Thus, by assigning more than one ADC bank to a particular ROI, the rate at which the pixels of this ROI are digitized may be increased, allowing the ROI images to be generated at a higher frame rate than full-resolution images.

Modifying the assignment of ADC banks to different ROIs may be facilitated by a plurality of multiplexers. Namely, each respective multiplexer of the plurality of multiplexers may be electrically connected to a corresponding ADC bank and a corresponding subset of the plurality of ROIs. For example, a first of eight ADC banks may be connected to each of the ROIs that make up a first half of an area of the image sensor (e.g., ROIs 0, 2, 4, and 6 out of ROIs 0-8) by way of a first multiplexer. The first multiplexer may thus be configured to selectively establish electrical connections between the first ADC and one of ROIs 0, 2, 4, or 6 based on the control signal provided to the first multiplexer.

The image sensor and at least a portion of the accompanying circuitry may be implemented as layers of an integrated circuit. This integrated circuit may be communicatively connected to a central control system of the autonomous vehicle. For example, a first layer of the integrated circuit may implement the pixels of the image sensor, a second layer of the integrated circuit may implement image processing circuitry (e.g., high dynamic range (HDR) algorithms, ADCs, pixel memories, etc.) that is configured to process the signals generated by the pixels, and a third layer of the integrated circuit may implement neural network circuitry that is configured to analyze signals generated by the image processing circuitry in the second layer for object detection, classification, and other attributes.

Accordingly, in some implementations, the generation and analysis of both the full-resolution and ROI images, as well as selection of the ROI representing the object of interest, may be performed by this integrated circuit. Once the full-resolution image and the ROI images are processed and the attributes of the object of interest are determined, the attributes of the object of interest may be transmitted to the control system of the autonomous vehicle. That is, the full-resolution image and/or the ROI images might not be transmitted to the control system, thus reducing the amount of bandwidth utilized and necessitated by communication between the integrated circuit and the control system. Notably, in some cases, a portion of the generated image data (e.g., the full-resolution image) may be transmitted along with the attributes of the object of interest.

In other implementations, the analysis of the full-resolution image and the ROI images, as well as selection of the ROI representing the object of interest, may be performed by the control system. The control system may thus cause the integrated circuit to generate the ROI images using the selected region of interest. While this approach may utilize more bandwidth, it may nevertheless allow the control system to obtain more images (i.e., ROI images) that represent portions of the environment that are of interest, rather than obtaining fewer full-resolution images that represent portions of the environment lacking features of interest.

The image sensor and its circuitry may additionally be configured to generate a stacked full-resolution image based on a plurality of full-resolution images. The stacked full-resolution image may be an HDR image, an image that represents a plurality of objects in-focus in spite of these objects being located at different depths, or an image that represents some other combination or processing of the plurality of full-resolution images. Notably, the plurality of full-resolution images may be combined by the circuitry, rather than by the control system of the vehicle. Accordingly, the plurality of full-resolution images may be generated at a higher frame rate than these images would otherwise be generated if they were each to be provided to the control system. The stacked image may contain more information than an individual full-resolution image due to the fact that information from multiple such full-resolution images is represented in the stacked image.

II. Example Smart Sensor

FIG. 1 is a block diagram of an example image sensor 100 with three integrated circuit layers. Image sensor 100 may use the three integrated circuit layers to detect objects. For example, image sensor 100 may capture an image that includes a person and output an indication of "person detected." In another example, image sensor 100 may capture an image and output a portion of the image that includes a vehicle that was detected by image sensor 100.

The three integrated circuit layers includes a first integrated circuit layer 110, a second integrated circuit layer 120, and a third integrated circuit layer 130. First integrated circuit layer 110 is stacked on second integrated circuit layer 120, and second integrated circuit layer 120 is stacked on third integrated circuit layer 130. First integrated circuit layer 110 may be in electrical communication with second integrated circuit layer 120. For example, first integrated circuit layer 110 and second integrated circuit layer 120 may be physically connected to one another with interconnects. Second integrated circuit layer 120 may be in electrical communication with third integrated circuit layer 130. For example, second integrated circuit layer 120 and third integrated circuit layer 130 may be physically connected to one another with interconnects.

First integrated circuit layer 110 may have a same area as second integrated circuit layer 120. For example, the length and width of first integrated circuit layer 110 and second integrated circuit layer 120 may be the same while the heights may be different. Third integrated circuit layer 130 may have a larger area than first and second integrated circuit layers 110, 120. For example, third integrated circuit layer 130 may have a length and width that are both twenty percent greater than the length and the width of first and second integrated circuit layers 110, 120.

First integrated circuit layer 110 may include an array of pixel sensors that are grouped by position into pixel sensor groups (each pixel sensor group referred to as "pixel group" in FIG. 1) 112A-112C (collectively referred to by 112). For example, first integrated circuit layer 110 may include a 6400×4800 array of pixel sensors grouped into three hundred twenty by two hundred forty pixel sensor groups, where each pixel sensor group includes an array of 20×20 pixel sensors. Pixel sensor groups 112 may be further grouped to define ROIs.

Each of pixel sensor groups 112 may include 2×2 pixel sensor sub-groups. For example, each of the pixel sensor groups of 20×20 pixel sensors may include ten by ten pixel sensor sub-groups, where each pixel sensor sub-group includes a red pixel sensor in an upper left, a green pixel sensor in a lower right, a first clear pixel sensor in a lower left, and a second clear pixel sensor in an upper right, each sub-group also referred to as Red-Clear-Clear-Green (RCCG) sub-groups.

In some implementations, the size of the pixel sensor groups may be selected to increase silicon utilization. For example, the size of the pixel sensor groups may be such that more of the silicon is covered by pixel sensor groups with the same pattern of pixel sensors.

Second integrated circuit layer 120 may include image processing circuitry groups (each image processing circuitry group referred to as "process group" in FIG. 1) 122A-122C (collectively referred to by 122). For example, second integrated circuit layer 120 may include three hundred twenty by two hundred forty image processing circuitry groups. Image processing circuitry groups 122 may be configured to each receive pixel information from a corresponding pixel sensor group and further configured to perform image processing operations on the pixel information to provide processed pixel information during operation of image sensor 100.

In some implementations, each image processing circuitry group 122 may receive pixel information from a single corresponding pixel sensor group 112. For example, image processing circuitry group 122A may receive pixel information from pixel sensor group 112A and not from any other pixel group, and image circuitry processing group 122B may receive pixel information from pixel sensor group 112B and not from any other pixel group.

In some implementations, each image processing circuitry group 122 may receive pixel information from multiple corresponding pixel sensor groups 112. For example, image processing circuitry group 122A may receive pixel information from both pixel sensor groups 112A and 112B and no other pixel groups, and image processing circuitry group 122B may receive pixel information from pixel group 112C and another pixel group, and no other pixel groups.

Having image processing circuitry groups 122 receive pixel information from corresponding pixel groups may result in fast transfer of the pixel information from first integrated circuit layer 110 to second layer 120 as image processing circuitry groups 122 may physically be close to the corresponding pixel sensor groups 112. The longer the distance over which information is transferred, the longer the transfer may take. For example, pixel sensor group 112A may be directly above image processing circuitry group 122A and pixel sensor group 112A may not be directly above the image processing circuitry group 122C, so transferring pixel information from pixel sensor group 112A to the image processing circuitry group 122A may be faster than transferring pixel information from the pixel sensor group 112A to image processing circuitry group 122C, if there were interconnects between pixel sensor group 112A and image processing circuitry group 122C.

Image processing circuitry groups 122 may be configured to perform image processing operations on pixel information that image processing circuitry groups 122 receives from the pixel groups. For example, image processing circuitry group 122A may perform high dynamic range fusion on pixel information from pixel sensor group 112A and image processing circuitry group 122B may perform high dynamic range fusion on pixel information from pixel sensor group 112B. Other image processing operations may include, for example, analog to digital signal conversion and demosaicing.

Having image processing circuitry groups 122 perform image processing operations on pixel information from corresponding pixel sensor groups 112 may enable image processing operations to be performed in a distributed fashion in parallel by image processing circuitry groups 122. For example, image processing circuitry group 122A may perform image processing operations on pixel information from pixel sensor group 112A at the same time as image processing circuitry group 122B performs image processing operations on pixel information from pixel group 122B.

Third integrated circuit layer 130 may include neural network circuitry groups 132A-132C (each neural network circuitry group referred to as "NN group" in FIG. 1) 132A-132C (collectively referred to by 132) and full image neural network circuitry 134. For example, third integrated circuit layer 130 may include three hundred twenty by two hundred forty neural network circuitry groups.

Neural network circuitry groups 132 may be configured to each receive processed pixel information from a corresponding image processing circuitry group and further configured to perform analysis for object detection on the processed pixel information during operation of image sensor 100. In some implementations, neural network circuitry groups 132 may each implement a convolutional neural network (CNN).

In some implementations, each neural network circuitry group 132 may receive processed pixel information from a single corresponding image processing circuitry group 122. For example, neural network circuitry group 132A may receive processed pixel information from image processing circuitry group 122A and not from any other image processing circuitry group, and neural network circuitry group 132B may receive processed pixel information from image processing circuitry group 122B and not from any other image processing circuitry group.

In some implementations, each neural network circuitry group 132 may receive processed pixel information from multiple corresponding image processing circuitry groups 122. For example, neural network circuitry group 132A may receive processed pixel information from both image processing circuitry groups 122A and 122B and no other image processing circuitry groups, and neural network circuitry group 132B may receive processed pixel information from both image processing circuitry group 122C and another pixel group, and no other pixel groups.

Having the neural network circuitry groups 132 receive processed pixel information from corresponding image processing circuitry groups may result in fast transfer of the processed pixel information from second integrated circuit layer 120 to third integrated circuit layer 130 as neural network circuitry groups 132 may physically be close to the corresponding image processing circuitry groups 122. Again, the longer the distance over which information is transferred, the longer the transfer may take. For example, image processing circuitry group 122A may be directly above neural network circuitry group 132A so transferring processed pixel information from image processing circuitry group 122A to neural network circuitry group 132A may be faster than transferring processed pixel information from image processing circuitry group 122A to neural network circuitry group 132C, if there were interconnects between image processing circuitry group 122A and neural network circuitry group 132C.

Neural network circuitry groups 132 may be configured to detect objects from the processed pixel information that neural network circuitry groups 132 receive from image processing circuitry groups 122. For example, neural network circuitry group 132A may detect objects from the processed pixel information from image processing circuitry group 122A, and neural network circuitry group 132B may detect objects from the processed pixel information from image processing circuitry group 122B.

Having neural network circuitry groups 132 detect objects from the processed pixel information from corresponding image processing circuitry group 122 enables detection to be performed in a distributed fashion in parallel by each of neural network circuitry groups 132. For example, neural network circuitry group 132A may detect objects from processed pixel information from image processing circuitry group 122A at the same time as neural network circuitry group 132B may detect objects from processed pixel information from image processing circuitry group 122B.

In some implementations, neural network circuitry groups 132 may perform intermediate processing. Accordingly, image sensor 100 may use the three integrated circuit layers 110, 120, and 130 to perform some intermediate processing and output just an intermediate result. For example, image sensor 100 may capture an image that includes a person and output an indication of "area of interest in some region of the image," without classifying the object of interest (the person). Other processing, performed outside image sensor 100 may classify the region of interest as a person.

Accordingly, the output from image sensor 100 may include some data representing the output of some convolutional neural network. This data in itself may be hard to decipher, but once it continues to be processed outside image sensor 100, the data may be used to classify the region as including a person. This hybrid approach may have an advantage of reducing required bandwidth. Accordingly, output from neural network circuitry groups 132 may include one or more of selected regions of interest for pixels representing detections, metadata containing temporal and geometrical location information, intermediate computational results prior to object detection, statistical information regarding network certainty level, and classifications of detected objects.

In some implementations, neural network circuitry groups 132 may be configured to implement CNNs with high recall and low precisions. Neural network circuitry groups 132 may each output a list of objects detected, where the object was detected, and timing of detection of the object.

Full image neural network circuitry 134 may be configured to receive, from each of neural network circuitry groups 132, data that indicates objects that neural network circuitry groups 132 detected and detect objects from the data. For example, neural network circuitry groups 132 may be unable to detect objects that are captured by multiple pixel groups, as each individual neural network circuitry group may only receive a portion of processed pixel information corresponding to the object. But, full image neural network circuitry 134 may receive data from multiple neural network circuitry groups 132 and may thus be able to detect objects sensed by multiple pixel groups. In some implementations, full image neural network circuitry 134 may implement a recurrent neural network (RNN). The neural networks may be configurable, both in regard to their architecture (number and type of layers, activation functions, etc.) as well as in regard to the actual values of neural network components (e.g. weights, biases, etc.)

In some implementations, having image sensor 100 perform processing may simplify a processing pipeline architecture, provide higher bandwidth and lower latency, allow for selective frame rate operations, reduce costs with the stacked architecture, provide higher system reliability as an integrated circuit may have fewer potential points of failure, and provide significant cost and power savings on computational resources.

III. Example ROI Arrangement and Hardware

Figure 2A:
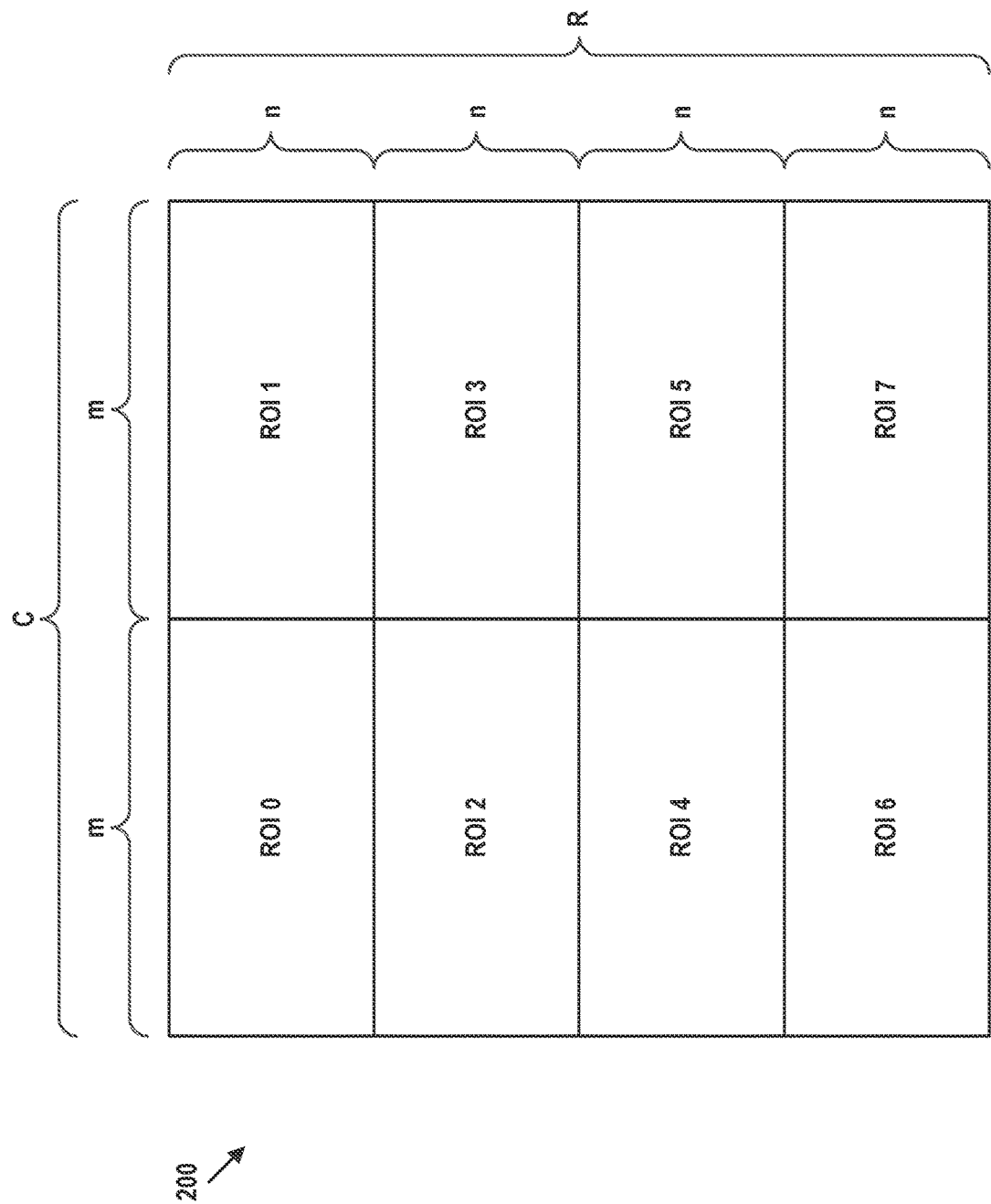
FIG. 2A illustrates an arrangement of regions of interest, in accordance with example embodiments.

FIG. 2A illustrates an example arrangement of ROIs on an image sensor. Namely, image sensor 200 may include pixels forming C columns and R rows. Image sensor 200 may correspond to first integrated circuit layer 110. Image sensor may be divided into eight ROIs, including ROI 0, ROI 1, ROI 2, ROI 3, ROI 4, ROI 5, ROI 6, and ROI 7 (i.e., ROIs 0-7), each of which comprises m columns of pixels and n rows of pixels. Thus, C=2 m and R=4 n. In some implementations, each ROI may include therein multiple pixel groups 112. Alternatively, pixel groups 112 may be sized and arranged such that each pixel group is also an ROI. In some implementations, the ROIs may be arranged such that they do not collectively span the entire area of image sensor 200. Thus, a union of the ROIs may be smaller than an area of image sensor 200. Accordingly, the full-resolution image may have a higher pixel count than a union of the ROIs.

FIG. 2A illustrates the ROIs arranged into two columns, with even-numbered ROIs on the left and odd-numbered ROIs on the right. In other implementations, however, the ROIs and their numbering may be arranged in different ways. For example, ROIs 0-3 may be in the left column while ROIs 4-7 may be in the right column. In another example, the ROIs may divide image sensor 200 into 8 columns organized into a single row, with the ROIs numbered from 0-7 arranged from left to right along the 8 columns of the single row. In some implementations, the ROIs may be fixed in a given arrangement. Alternatively, the ROIs may be reconfigurable. Namely, the number of ROIs, position of each ROI, and the shape of each ROI may be reconfigurable.

Figure 2B:
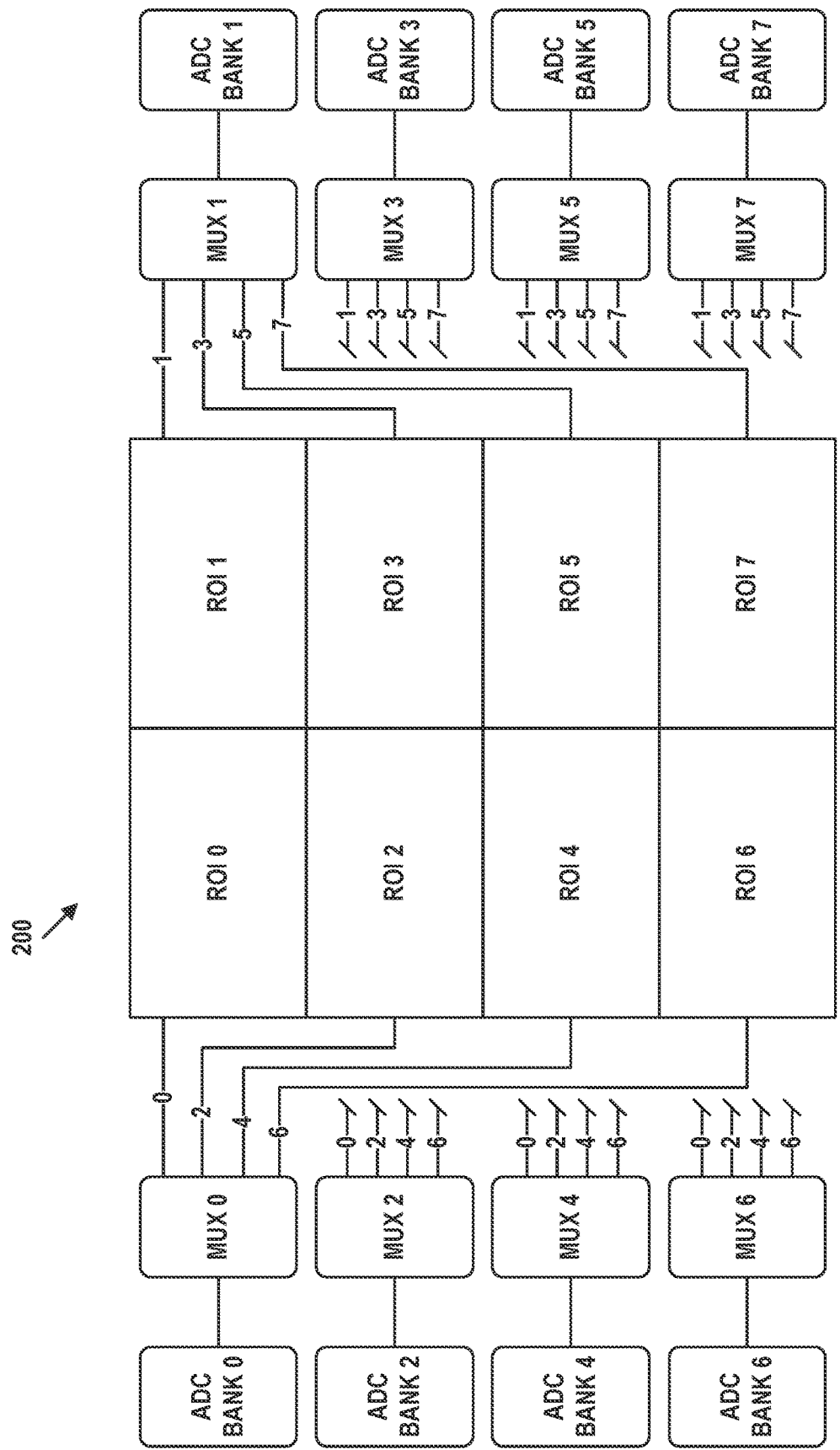
FIG. 2B illustrates pixel readout circuitry, in accordance with example embodiments.

FIG. 2B illustrates circuitry configured to allow for readout of both a full-resolution image and ROI images from image sensor 200. Namely, each of ROIs 0-7 may be associated with a corresponding ADC bank and a corresponding multiplexer. That is, ROI 0 is associated with mux 0 and ADC bank 0, ROI 1 is associated with mux 1 and ADC bank 1, ROI 2 is associated with mux 2 and ADC bank 2, ROI 3 is associated with mux 3 and ADC bank 3, ROI 4 is associated with mux 4 and ADC bank 4, ROI 5 is associated with mux 5 and ADC bank 5, ROI 6 is associated with mux 6 and ADC bank 6, and ROI 7 is associated with mux 7 and ADC bank 7.

Notably, each of mux 0, mux 2, mux 4, and mux 6 may be electrically connected to each of ROI 0, ROI 2, ROI 4, and ROI 6. For example, as illustrated in FIG. 2B, mux 0 is electrically connected to ROI 0, ROI 2, ROI 4, and ROI 6, as indicated by the numbers on the lines connecting these elements. Similarly, the numbers on the lines associated with each of mux 2, mux 4, and mux 6 indicate electrical connections to corresponding ROIs, although the complete connections are not shown for clarity of illustration. Thus, mux 0 can selectively connect ADC bank 0 to one of ROI 0, ROI 2, ROI 4, or ROI 6, and may change this connection over time (e.g., disconnect ADC bank 0 from ROI 0 and connect ADC bank 0 to ROI 4) based on a control signal provided to mux 0. Mux 2, mux 4, and mux 6 can similarly create electrical connections between ADC banks 2, 4, and 6, respectively, and ROIs 0, 2, 4, or 6.

Likewise, each of mux 1, mux 3, mux 5, and mux 7 may be electrically connected to each of ROI 1, ROI 3, ROI 5, and ROI 7. For example, as illustrated in FIG. 2B, mux 1 is electrically connected to ROI 1, ROI 3, ROI 5, and ROI 7, as indicated by the numbers on the lines connecting these elements. Similarly, the numbers on the lines associated with each of mux 3, mux 5, and mux 7 indicate electrical connections to corresponding ROIs, although the complete connections are not shown for clarity of illustration. Mux 1, mux 3, mux 5, and mux 7 can selectively create electrical connections between ADC banks 1, 3, 5, and 7, respectively, and ROIs 1, 3, 5, or 7, based on a control signals provided thereto.

In one implementation, ADC banks 0-7 and multiplexers 0-7 may be implemented as part of second integrated circuit layer 120 of image sensor 100. For example, the ADC banks and multiplexers may form part of process groups 122. Thus, each process group of process groups 122 may be electrically connected to (i) its corresponding pixel group and (ii) one or more other pixel groups belonging to one or more other ROIs, to allow the ADCs to digitize multiple different pixel groups. In another implementation, ADC banks 0-7 and multiplexers 0-7 may be implemented as part of a fourth layer of the integrated circuit of image sensor 100 or as components external to the integrated circuit of image sensor 100.

For the purpose of example, the illustrated arrangement of ADC banks 0-7 and multiplexers 0-7 assumes that ROIs 0-7 are fixed. In implementations where the number, size, shape, and position of ROIs is modifiable, additional multiplexers and/or additional electrical connections to different regions of image sensor 200 may be included to allow for additional selective connection between pixels and ADC banks 0-7. Further, additional components not shown herein, such as signal amplifiers, may be included as needed to read out and process the signals generated by each pixel of image sensor 200.

IV. Example Full Image and ROI Readout

Figure 3A:
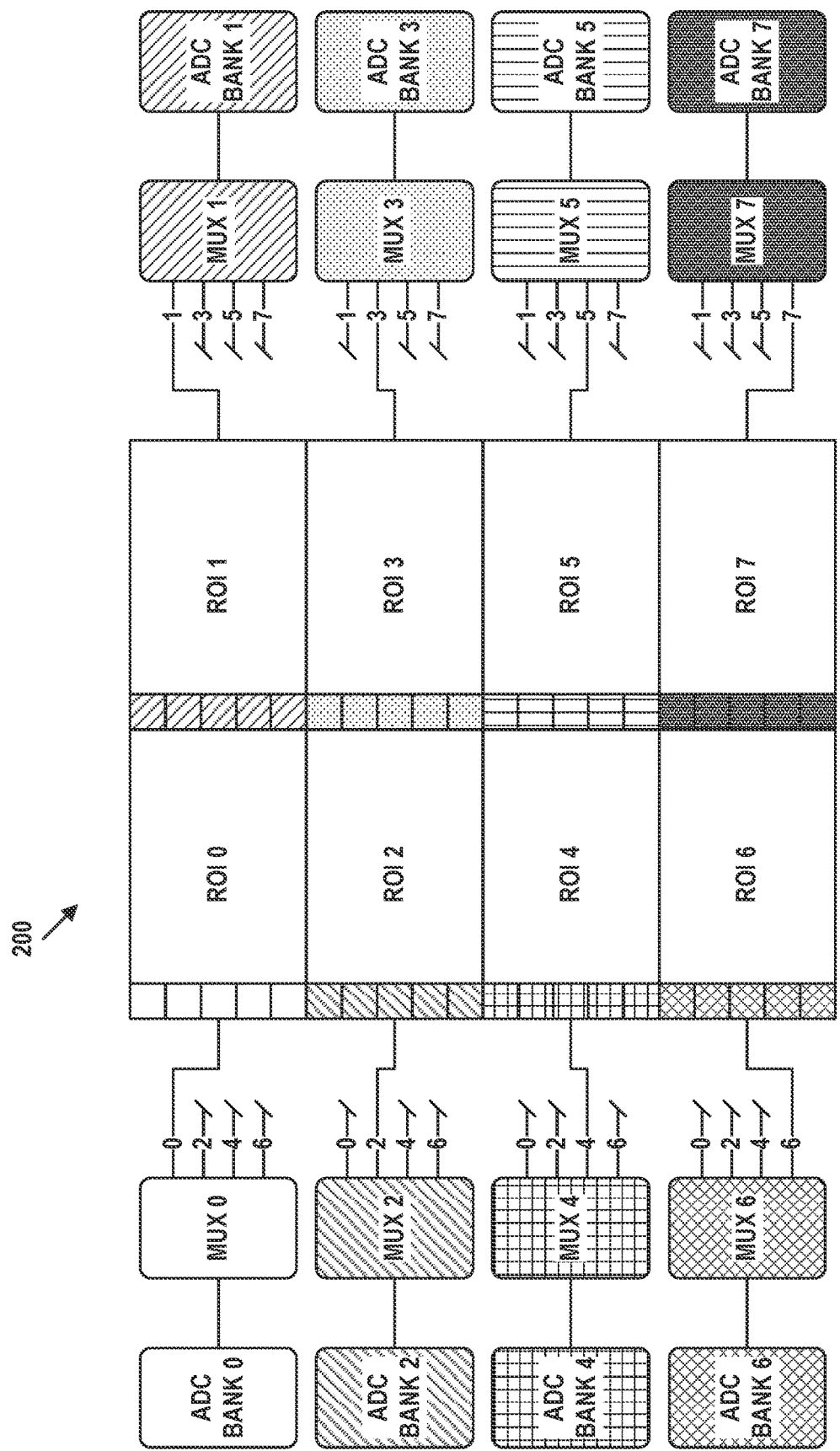
FIG. 3A illustrates a full image readout, in accordance with example embodiments.

FIG. 3A illustrates a full-resolution image readout of image sensor 200. Each of ADC banks 0-7, multiplexers 0-7, and select pixels of image sensor 200 are hatched using different patterns to illustrate the read-out process. Namely, ADC banks 0-7 may be used to read out the pixel values of image sensor 200 in a column-wise fashion. Specifically, ADC banks 0, 2, 4, and 6 may be used to digitize a first column of image sensor 200 (i.e., contained in ROIs 0, 2, 4, and 6), while ADC banks 1, 3, 5, and 7 may be used to digitize a second column of image sensor 200 (i.e., contained in ROIs 1, 3, 5, and 7).

Each of multiplexers 0-7 may be used to establish an electrical connection between ADC banks 0-7, respectively, and ROIs 0-7, respectively, as shown in FIG. 2A. Notably, a solid line between a particular multiplexer and an ROI is used in FIG. 3A to indicate that the ROI is electrically connected to the corresponding ADC bank (e.g., ADC bank 2 is electrically connected to ROI 2). Once the first column and the second column of image sensor 200 are digitized, the circuitry may proceed to digitize a third column adjacent to the first column (i.e., by way of ADC banks 0, 2, 4, and 6) and a fourth column adjacent to the second column (i.e., by way of ADC banks 1, 3, 5, and 7). In particular, the third and fourth column may be selected for digitization by driving different column selection lines of image sensor 200.

The full-resolution image may be used to select one or more ROIs for which ROI images are to be acquired. For example, the full-resolution images may be analyzed to detect therein an object of interest. An ROI that contains or is expected to contain the object of interest may be selected to be used to generate a plurality of ROI images for further analysis. An object may be considered to be of interest based on, for example, a speed of the object (e.g., when this speed exceeds a threshold speed or is below the threshold speed) a distance between image sensor 100 and the object (e.g., when this distance exceeds a threshold distance is below the threshold distance), and/or a classification of the object, among other possibilities. In some implementations, selection of the ROI may be performed by third integrated circuit layer 130 of image sensor 100. For example, full image NN circuitry 134 may be used to select the ROI. In other implementations, the ROI may be selected by a control system that is communicatively connected to and operates based on the outputs of image sensor 100. Once a particular ROI is selected, the ROI may be used to acquire a plurality of ROI images.

Figure 3B:
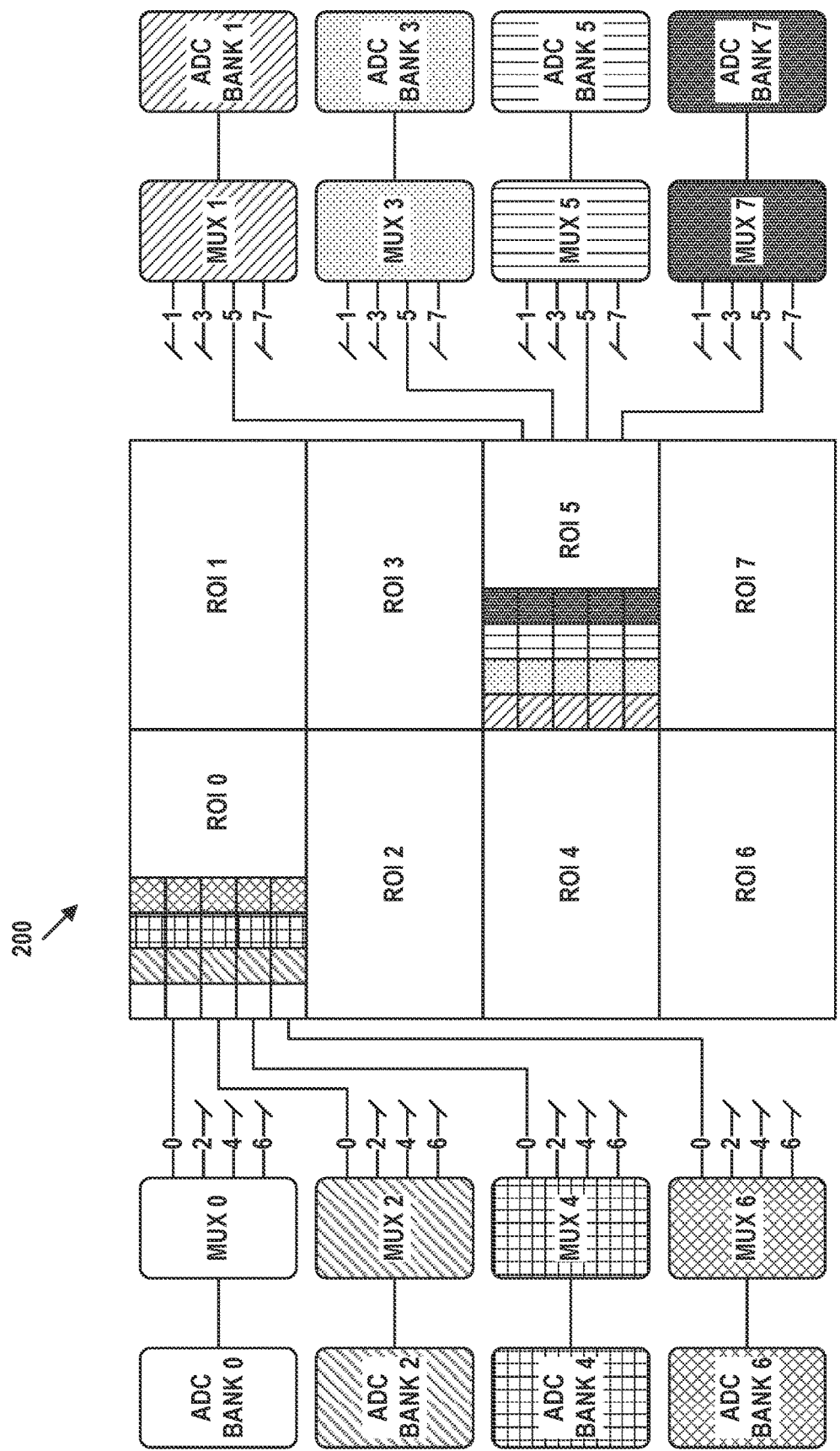
FIG. 3B illustrates regions of interest readout, in accordance with example embodiments.

FIG. 3B illustrates a reassignment of ADC banks 0-7 to different ROIs to allow for faster ROI read-out. Namely, rather than reading out a full-resolution image as in FIG. 3A, ADC banks 0-7 may instead be used to read-out ROIs 0 and 5. To that end, each of ADC banks 0, 2, 4, and 6 may be provided with, by way of multiplexers 0, 2, 4, and 6, respectively, pixel data from ROI 0. That is, ADC banks 2, 4, and 6 may be reassigned from their associated ROIs 2, 4, and 6, respectively, to ROI 0. ADC bank 0 may be used to read out a first column of ROI 0, ADC bank 2 may be used to read out a second column of ROI 0, ADC bank 4 may be used to read out a third column of ROI 0, and ADC bank 6 may be used to read out a fourth column of ROI 0.

Similarly, each of ADC banks 1, 3, 5, and 7 may be provided with, by way of multiplexers 1, 3, 5, and 7, respectively, pixel data from ROI 5. That is, ADC banks 3, 5, and 7 may be reassigned from their associated ROIs 3, 5, and 7, respectively, to ROI 5. ADC bank 1 may be used to read out a first column of ROI 5, ADC bank 3 may be used to read out a second column of ROI 5, ADC bank 5 may be used to read out a third column of ROI 5, and ADC bank 7 may be used to read out a fourth column of ROI 5.

The readout of the four columns of ROI 0 and the four columns of ROI 5 may be performed simultaneously or in parallel. That is, ADC banks 0, 2, 4, and 6 may operate in parallel with one another to read a four-column portion of ROI 0 at once. Similarly, ADC banks 1, 3, 5, and 7 may operate in parallel with one another to read a four-column portion of ROI 5 at once. Further, the readout of ROI 0 and ROI 5 may also be parallel. Thus, this arrangement may be used to read out 8 ROI images (four images from ROI 0 and four images from ROI 5) in the time it takes to read out a single full-resolution image.

In the examples shown, the number of rows n in each ROI is equal to 5 for clarity of illustration. In practice, n may be much larger than 5 (e.g., 1250). Further, in some implementations, the ADC banks may be used to read out the columns of the selected ROI in an order different from that shown herein. Further, in some implementations, multiplexers 0-7 may be configured to reassign each of ADC banks 0-7 to any one of ROIs 0-7, thus allowing a single ROI to be digitized by 8 ADC banks in parallel. In some implementations, the number of ADCs per ADC bank may be equal to the number of pixel rows in each ROI (i.e., ADCs per bank=n), thus allowing an entire column of the ROI to be digitized in one cycle by the corresponding ADC bank. In other implementations, the number of ADCs per bank may be smaller (e.g., ADCs per bank=n/2).

V. Example Multiplexer-Based Readout Hardware

Figure 3C:
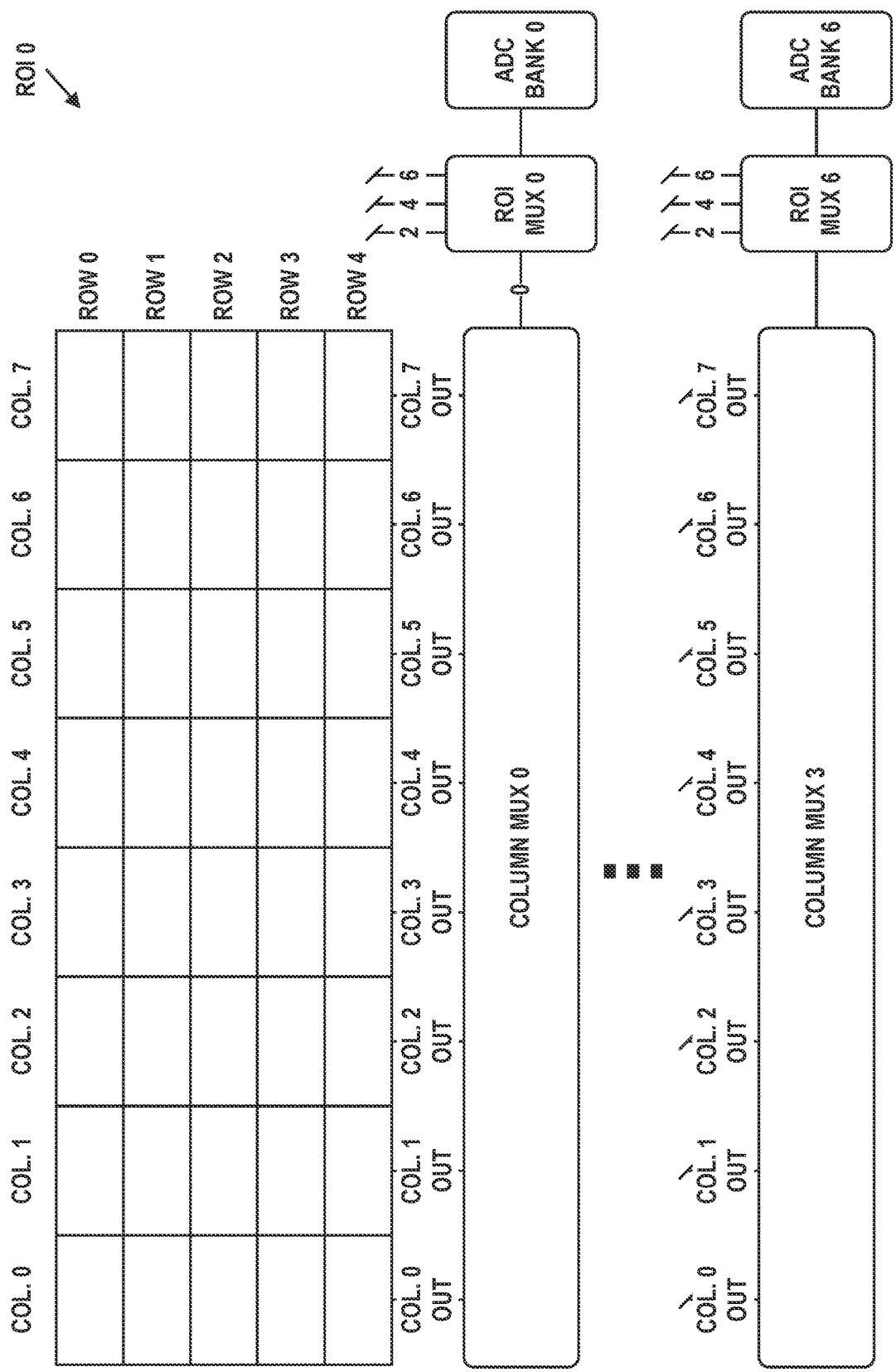
FIG. 3C illustrates readout circuitry, in accordance with example embodiments.

FIG. 3C illustrates, in further detail, example multiplexer circuitry that allows the ADC banks to read out different columns of a single ROI in parallel. Namely, ROI 0 is shown divided into five rows labeled row 0, row 1, row 2, row 3, and row 4 (i.e., rows 0-4), and eight columns labeled col. 0, col. 1, col. 2, col. 3, col. 4, col. 5, col. 6, and col. 7 (i.e., cols. 0-7). The pixels of each of cols. 0-7 are each configured to generate a corresponding output signal. Thus, each respective column of cols. 0-7 is configured to output a corresponding 5-bit signal that represents the output values of the pixels in the respective column. Accordingly, col. 0 generates signal col. 0 out, col. 1 generates signal col. 1 out, col. 2 generates signal col. 2 out, col. 3 generates signal col. 3 out, col. 4 generates signal col. 4 out, col. 5 generates signal 5 col. 5, col. 6 generates signal col. 6 out, and col. 7 generates signal col. 7 out (i.e., cols. 0-7 generate signals cols. 0-7 out, respectively).

Each of signals cols. 0-7 out is provided as input to column mux 0, column mux 1 (not shown), column mux 2 (not shown) and column mux 3, each of which are associated with ROI 0. Column mux 0 is configured to select one of signals cols. 0-7 out and pass this signal on to ROI mux 0, thus allowing ADC bank 0 to digitize the pixels of a particular column of ROI 0. Similarly, column multiplexers 1-3 are each configured to select one of signals out 0-7 and pass the selected signals on to ROI multiplexers 2, 4, and 6, respectively, thus allowing ADC banks 2, 4, and 6 to digitize the pixels of a particular column of ROI 0. Accordingly, ROI multiplexers 0-7 are configured to select a particular ROI to be digitized, while column multiplexers 0-3 of each respective ROI are configured to select the columns to be digitized in the respective ROI.

In this example, ROI mux 0 and column mux 3 in FIG. 3C collectively represent a portion of the circuitry that allows mux 0 of FIGS. 2B, 3A, and 3B to operate as described. That is, mux 0 of FIGS. 2B, 3A, and 3B includes (i) ROI mux 0 configured to select among ROI 0, ROI 2, ROI 4, or ROI 6 and (ii) four instances of column mux 0, one for each of ROIs 0, 2, 4, and 6, configured to select among the columns of each of these ROIs (i.e., ROI 0 column mux 0 (shown in FIG. 3C), ROI 2 column mux 0 (not shown), ROI 4 column mux 0 (not shown), and ROI 6 column mux 0 (not shown)). Additionally, although only ROI 0 is illustrated in FIG. 3C, each respective ROI of ROIs 0-7 may be associated with a corresponding set of column multiplexers that allow different columns of the respective ROI to be selected for digitization by a particular ADC bank. For example, each respective ROI of ROIs 0-7 may be associated with a corresponding instance of column mux 0, column mux 1, column mux 2, and column mux 3.

To achieve the readout pattern of ROI 0 illustrated in FIG. 3B, column mux 0 may pass signal col. 0 out to ROI mux 0, column mux 1 may pass signal col. 1 out to ROI mux 2, column mux 2 may pass signal col. 2 out to ROI mux 4, and column mux 3 may pass signal col. 3 out to ROI mux 6. To that end, the column select lines (not shown) of each of columns 0-3 may be enabled, resulting in the pixel output of each pixel in these columns being exposed for readout on a separate output bit line. Additionally, each of ROI multiplexers 0, 2, 4, and 6 may pass on the inputs from ROI 0, rather than from ROIs 2, 4, or 6, to the corresponding ADC bank. The digitization process of ROI 0 may proceed by reconfiguring column mux 0 to pass signal col. 4 out to ROI mux 0, column mux 1 to pass signal col. 5 out to ROI mux 2, column mux 2 to pass signal col. 6 out to ROI mux 4, and column mux 3 to pass signal col. 7 out to ROI mux 6. To that end, the column select lines (not shown) of each of columns 4-7 may be enabled, resulting in the pixel output of each pixel in these columns being exposed for readout on a separate output bit line. Thus, the entirety of the five row by eight column pixel array that forms ROI 0 may be digitized.

As another example, to achieve the ROI 5 readout pattern illustrated in FIG. 3B, column mux 0 of ROI 5 may pass signal col. 0 out of ROI 5 to ROI mux 1, column mux 1 of ROI 5 may pass signal col. 1 out of ROI 5 to ROI mux 3, column mux 2 of ROI 5 may pass signal col. 2 out of ROI 5 to ROI mux 5, and column mux 3 of ROI 5 may pass signal col. 3 out of ROI 5 to ROI mux 7. Thus, each of ROI multiplexers 1, 3, 5, and 7 passes on the inputs from ROI 5, rather than from ROIs 1, 3, or 7, to the corresponding ADC bank. The digitization process of ROI 5 may proceed by reconfiguring column mux 0 of ROI 5 to pass signal col. 4 out of ROI 5 to ROI mux 1, column mux 1 of ROI 5 to pass signal col. 5 out of ROI 5 to ROI mux 3, column mux 2 of ROI 5 to pass signal col. 6 out of ROI 5 to ROI mux 5, and column mux 3 of ROI 5 to pass signal col. 7 out of ROI 5 to ROI mux 7. At each readout, the column select lines (not shown) of the corresponding columns may be enabled, resulting in the pixel output of each pixel in these columns being exposed for readout on a separate output bit line.

Notably, in the example above, cols. 0-7 of ROI 5 (or ROIs 1, 3, and 7) may alternatively be referred to as cols. 8-15 when viewed from the perspective of image sensor 200 as a whole. Further, (i) the column select/enable signals and (ii) the signals that control the column multiplexers and/or the ROI multiplexers to select particular inputs that achieve readout of a desired ROI may be generated by control circuitry included on image sensor 100. Specifically, such signals may be based on the ROI selected by image sensor 100 and/or by the control system.

VI. Example In-Pixel Readout Hardware

Figure 3D:
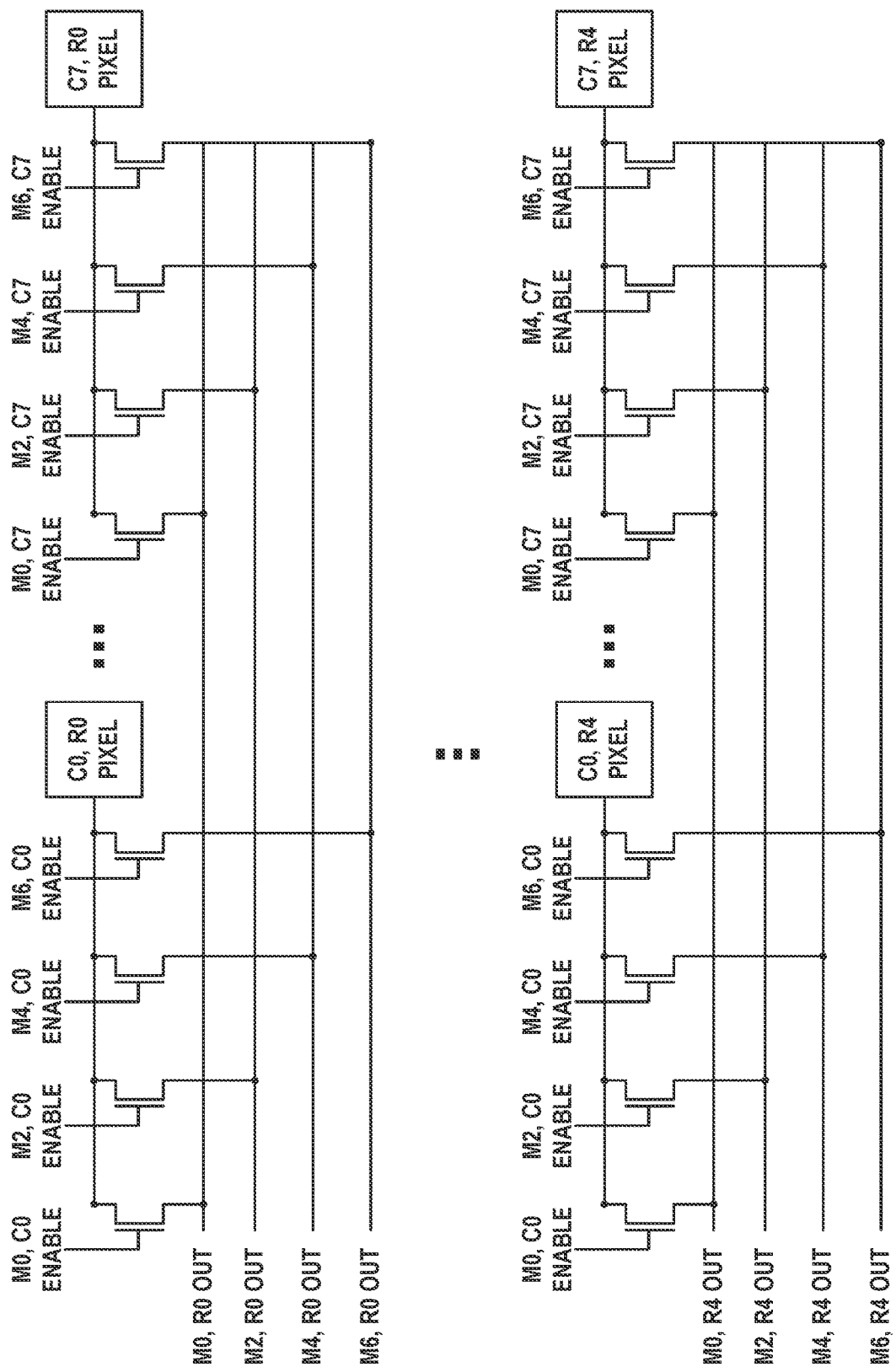
FIG. 3D illustrates readout circuitry, in accordance with example embodiments.
Figure 3E:
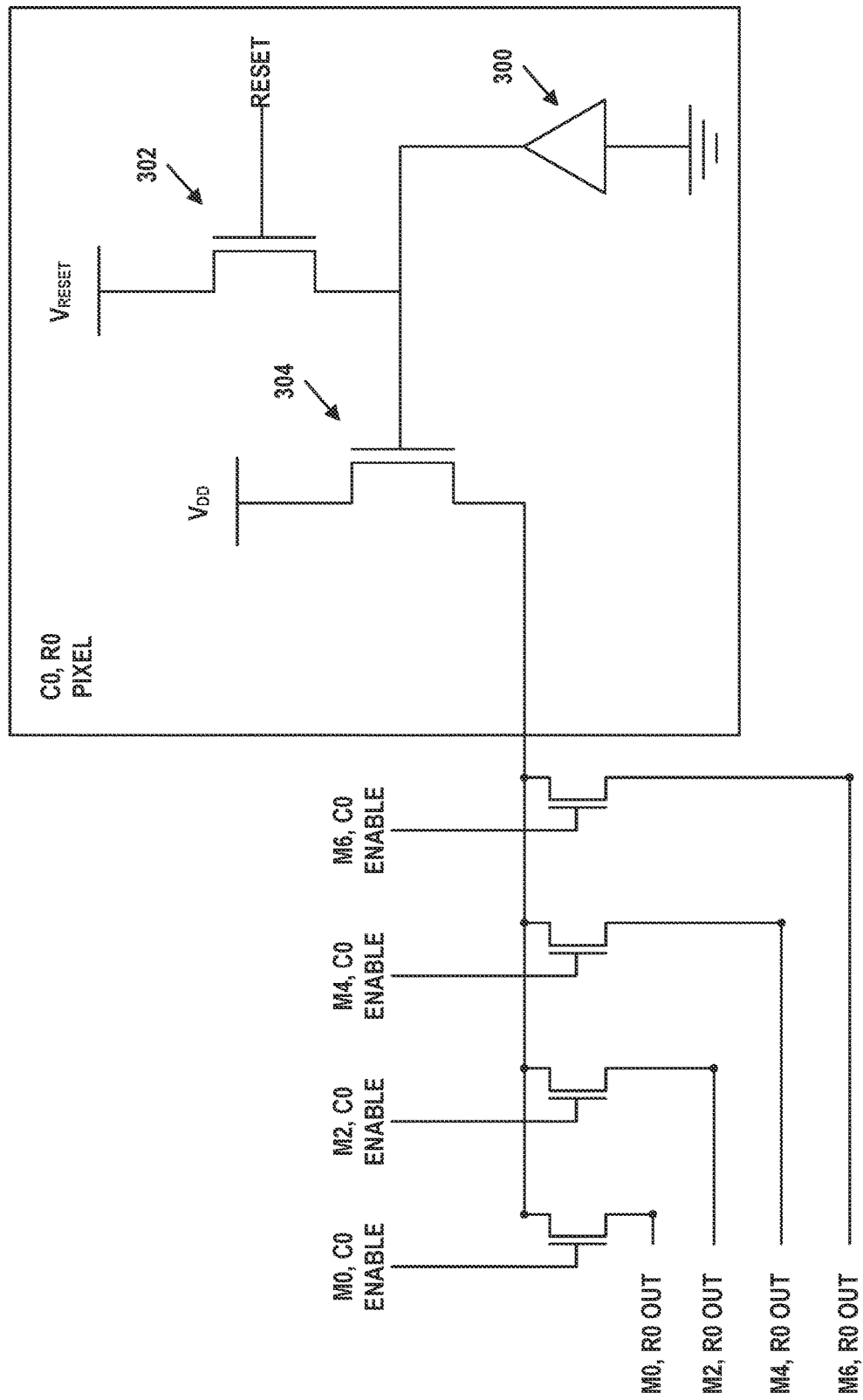
FIG. 3E illustrates readout circuitry, in accordance with example embodiments.

In an alternative implementation, parallel readout of two or more different columns of the image sensor may be enabled by additional in-pixel readout hardware. FIGS. 3D and 3E illustrate an example implementation of such in-pixel readout hardware to enable the readouts illustrated in and discussed with respect to FIGS. 3A and 3B. This in-pixel hardware may be used in combination with ROI multiplexers and in place of the column multiplexers illustrated in FIG. 3C. Since this additional in-pixel hardware allows the column multiplexer to be omitted, multiplexers 0-7 in FIGS. 2B, 3A, and 3B may be viewed, in the context of this implementation, as equivalent to the ROI multiplexers of FIG. 3C.

Specifically, to enable ROI readout, the number of pixel output lines, the number of column selection lines, and the number of enable transistors associated with each pixel may be increased. For example, in order to read out four different columns of ROI 0 in parallel, each pixel of ROI 0 may be associated with four column selection lines (i.e., one column selection line per ROI multiplexer) and four enable transistors each driven by a corresponding column selection line. Each row of pixels may also share four pixel output lines, each connected to a corresponding multiplexer.

Thus, as shown in FIG. 3D, the pixel of ROI 0 located in column 0, row 0 includes and/or is associated with four enable transistors, each connected to a corresponding column selection line at the gate thereof. The four enable transistors are driven (via the column selection lines) by control signals M0, C0 enable; M2, C0 enable; M4, C0 enable; and M6, C0 enable; respectively, and are connected to output lines M0, R0 out; M2, R0 out; M4, R0 out; and M6, R0 out; respectively. Signal M0, C0 enable corresponds to multiplexer 0, column 0 enable, with the remaining control signals corresponding to commensurate multiplexer-column pairs. Similarly, output M0, R0 out corresponds to multiplexer 0, row 0 output, with the remaining output lines corresponding to commensurate multiplexer-row pairs.

The pixel of ROI 0 located in column 7, row 0 includes and/or is associated with four enable transistors, each connected to a corresponding column selection line at the gate thereof. The four enable transistors are driven (via the column selection lines) by control signals M0, C7 enable; M2, C7 enable; M4, C7 enable; and M6, C7 enable; respectively, and are connected to output lines M0, R0 out; M2, R0 out; M4, R0 out; and M6, R0 out; respectively. Similarly, the pixel of ROI 0 located in column 0, row 4 includes and/or is associated with four enable transistors driven by control signals M0, C0 enable; M2, C0 enable; M4, C0 enable; and M6, C0 enable; respectively, and connected to output lines M0, R4 out; M2, R4 out; M4, R4 out; and M6, R4 out; respectively. The pixel of ROI 0 located in column 7, row 4 includes and/or is associated with four enable transistors driven by control signals M0, C7 enable; M2, C7 enable; M4, C7 enable; and M6, C7 enable; respectively, and connected to output lines M0, R4 out; M2, R4 out; M4, R4 out; and M6, R4 out; respectively.

Thus, in general, a pixel of a particular ROI located in column i, row j includes and/or is associated with four enable transistors driven by control signals M0, Ci enable; M2, Ci enable; M4, Ci enable; and M6, Ci enable; respectively, and connected to output lines M0, Rj out; M2, Rj out; M4, Rj out; and M6, Rj out; respectively.

In this example, output lines M0, R0; M0, R1 (not shown); M0, R2 (not shown); M0, R3 (not shown); and M0, R4 collectively define the input to mux 0 indicated in FIGS. 2B, 3A, and 3B with the line between mux 0 and ROI 0 labeled with "0." Similarly, output lines M2, R0; M2, R1 (not shown); M2, R2 (not shown); M2, R3 (not shown); and M2, R4 collectively define the input to mux 2 indicated in FIGS. 2B, 3A, and 3B with the line between mux 2 and ROI 0 labeled with "2." Output lines M4, R0; M4, R1 (not shown); M4, R2 (not shown); M4, R3 (not shown); and M4, R4 collectively define the input to mux 4 indicated in FIGS. 2B, 3A, and 3B with the line between mux 4 and ROI 0 labeled with "4." Output lines M6, R0; M6, R1 (not shown); M6, R2 (not shown); M6, R3 (not shown); and M6, R4 collectively define the input to mux 6 indicated in FIGS. 2B, 3A, and 3B with the line between mux 6 and ROI 0 labeled with "6".

Each of ROIs 1-7 may be associated with commensurate instances of the circuitry shown in FIG. 3D that defines corresponding inputs to multiplexers 0-7. Input signals and output signals that are specific to a particular ROI may be disambiguated from corresponding signals of another ROI another by, for example, appending the ROI number to the signal name. For example, "ROI 0" may be prepended to the names of each of the output lines of ROI 0 (e.g., with "M0, R0 out" becoming ROI 0, M0, R0"), "ROI 2" may be prepended to the names of each of the output lines of ROI 2 (e.g., with "M0, R0 out" becoming ROI 2, M0, R0"), and so on. Alternatively, each signal may be indexed with respect to image sensor 200 as a whole, rather than with respect to individual ROIs.

Specifically, in the example shown, each ROI is assumed to be divided into eight columns indexed from 0 to 7 and five rows indexed from 0 to 4. Thus, there may be multiple rows having the same index in the context of image sensor 200 as a whole. As explained above, these rows may be disambiguated from another on the basis of the ROI to which they belong. Similarly, columns having the same index may be disambiguated from one another on the basis of the ROI to which they belong. Alternatively, the rows and columns may be indexed with respect to the image sensor as a whole, rather than with respect to the ROIs. Accordingly, rows may be indexed from 0 to 19 and columns may be indexed from 0 to 15. The naming of the control signals described herein may be commensurately updated to indicate this difference in indexing. For example, ROI 2 may include rows 5-9, ROI 4 may include rows 10-14, and ROI 6 may include rows 15-19. Similarly, ROIs 0, 2, 4, and 6 may include columns 0-7 and ROIs 1, 3, 5, and 7 may include columns 8-15.

The full-resolution image readout illustrated in FIG. 3A may be accomplished by controlling each multiplexer k to connect to its corresponding ROI k (where k=0, 1, 2, ... 7) and by sequentially driving column select lines Mk, Cx enable high from column x=0 to column x=7. For each readout in the sequence from column x=0 to column x=7, mux k will pass the values of Mk, R0 out; Mk, R1 out; Mk, R2 out; Mk, R3 out; and Mk, R4 out; as input to ADC bank k. For example, for column x=0, signals M0, C0 enable; M1, C0 enable; M2, C0 enable; M3, C0 enable; M4, C0 enable; M5, C0 enable; M6, C0 enable; and M7, C0 enable may be driven high (i.e., may be active) and each of multiplexers 0-7 may pass to ADC banks 0-7, respectively, the output values of all rows in column 0.

An ROI image readout may be accomplished by controlling each of multiplexers 0, 2, 4, and 6 to connect to selected ROI p (where p=0, 2, 4, or 6) and each of multiplexers 1, 3, 5, and 7 to connect to selected ROI r (where r=1, 3, 5, or 7). The first half of the ROI image for ROI p may be read out by driving column select lines M0, C0 enable; M2, C1 enable; M4, C2 enable; and M6, C3 enable high and passing signals M0, R0 out-M0, R4 out; M2, R0 out-M2, R4 out; M4, R0 out-M4, R4 out; and M6, R0 out-M6, R4 of ROI p through to ADC banks 0, 2, 4, and 6, respectively, by way of multiplexers 0, 2, 4, and 6, respectively. The second half of the ROI image for ROI p may be read out by driving column select lines M0, C4 enable; M2, C5 enable; M4, C6 enable; and M6, C7 enable high and passing signals M0, R0 out-M0, R4 out; M2, R0 out-M2, R4 out; M4, R0 out-M4, R4 out; and M6, R0 out-M6, R4 of ROI p through to ADC banks 0, 2, 4, and 6, respectively, by way of multiplexers 0, 2, 4, and 6, respectively.

Similarly, the first half of the ROI image for ROI r may be read out by driving column select lines M1, C0 enable; M3, C1 enable; M5, C2 enable; and M7, C3 enable high and passing signals M1, R0 out-M1, R4 out; M3, R0 out-M3, R4 out; M5, R0 out-M5, R4 out; and M7, R0 out-M7, R4 of ROI r through to ADC banks 1, 3, 5, and 7, respectively, by way of multiplexers 1, 3, 5, and 7, respectively. The second half of the ROI image for ROI r may be read out by driving column select lines M1, C4 enable; M3, C5 enable; M5, C6 enable; and M7, C7 enable high and passing signals M1, R0 out-M1, R4 out; M3, R0 out-M3, R4 out; M5, R0 out-M5, R4 out; and M7, R0 out-M7, R4 of ROI r through to ADC banks 1, 3, 5, and 7, respectively, by way of multiplexers 1, 3, 5, and 7, respectively.

FIG. 3E illustrates additional components of example pixel C0, R0. Each pixel of image sensor 200 may include corresponding instances of such circuitry connected to the associated enable transistors that allow for parallel readout of multiple columns of an ROI. Pixel C0, R0 may include photodiode 300 configured to generate a charge based on incoming photons, pixel amplifier transistor 304 configured to convert the charge generated by photodiode 300 into a voltage, and reset transistor 302 configured to empty the charge collected by photodiode 300 when "RESET" signal at the gate thereof is active.

In conventional, non-ROI-enabled pixels, each pixel includes one enable transistor configured to expose the output of amplifier transistor 304 to the pixel output line when driven by a column selection signal. Such pixels may be referred to as three transistor (3 T) pixels. Pixels may also be implemented by including an additional fourth transistor (e.g., a transfer transistor) between photodiode 300 and reset transistor 302, and may be referred to at four transistor (4 T) pixels. Parallel readout of an ROI by four ADC banks is enabled by the inclusion of three additional enable transistors connected to the output of amplifier transistor 304. Thus, pixel C0, R0 shown in FIG. 3E includes a total of 4 enable transistor. These enable transistors are drawn outside of the area of pixel C0, R0 to illustrate the relationship between FIGS. 3D and 3E. These enable transistors may, however, be disposed within the physical area of image sensor 200 that is dedicated to pixel C0, R0.

VII. Example Timing of Image Readout and Processing

Figure 4:
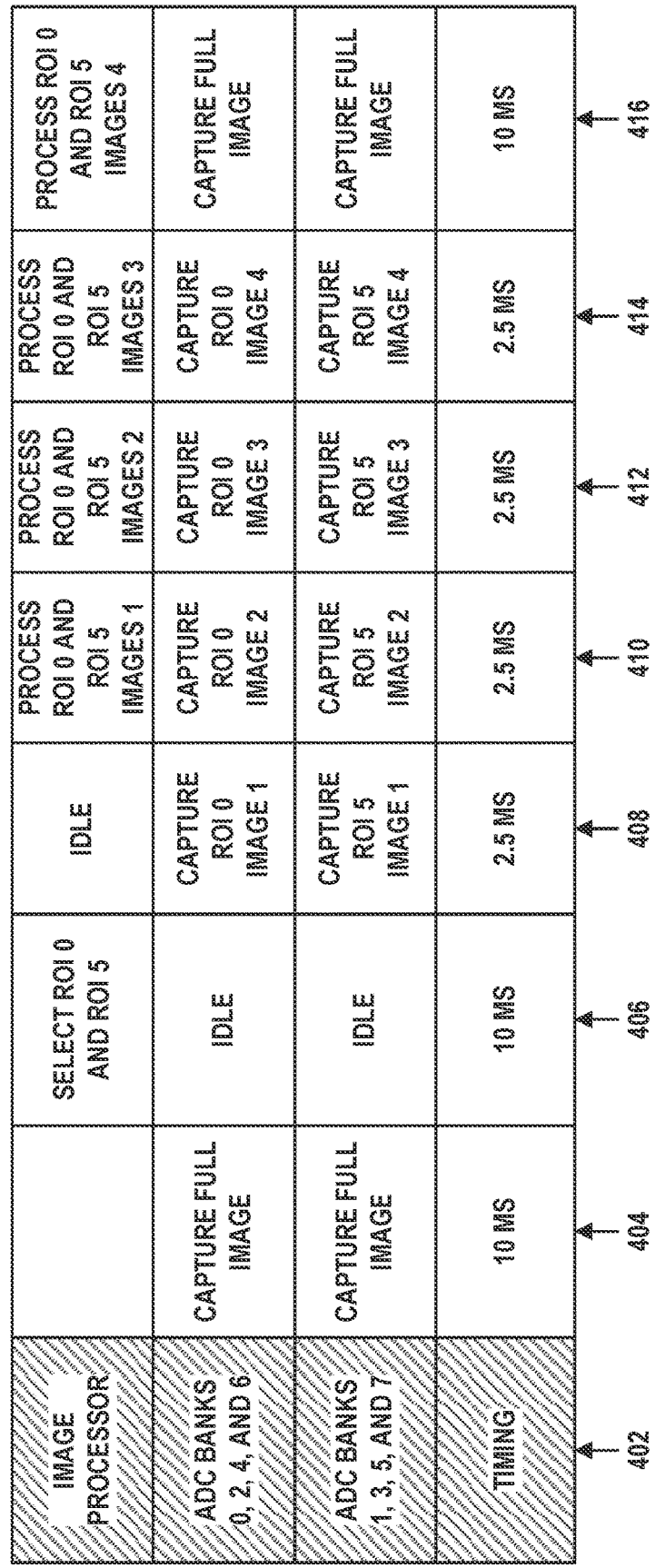
FIG. 4 illustrates a timing diagram, in accordance with example embodiments.

FIG. 4 illustrates an example timing diagram 400. As indicated by heading column 402, the first (top-most) row of diagram 400 indicates operations of an image processor, the second row indicates operations of ADC banks 0, 2, 4, and 6, the third row indicates operations of ADC banks 1, 3, 5, and 7, and the fourth (bottom-most) row indicates an amount of time dedicated to each operation. The image processor may collectively represent operations carried out by second integrated circuit layer 120, third integrated circuit layer 130, and any other control systems communicatively connected to image sensor 100 or 200.

At interval 404, which may last 10 milliseconds (ms), ADC banks 0-7 may be used to capture a full-resolution image. At interval 406, which may last 10 ms, image processor may process this full-resolution image and, based on this processing, select ROIs 0 and 5 for which to acquire a plurality of ROI images. ADC banks 0-7 may remain idle during this interval.

At intervals 408, 410, 412, and 414, each of which may last 2.5 ms, ADC banks 0, 2, 4, and 6 may capture ROI 0 images 1, 2, 3, and 4, respectively, and ADC banks 1, 3, 5, and 7 may capture ROI 5 images 1, 2, 3, and 4, respectively. At interval 408, the image processor may be idle. At intervals 410, 412, 414, and 416, the image processor may process ROI 0 images 1, 2, 3, and 4, respectively, and ROI 5 images 1, 2, 3, and 4, respectively. Processing of the ROI images may allow the image processor to determine various attributes of the contents of the environment represented by these images, as previously discussed.

At interval 416, which may last 10 ms, ADC banks 0-7 may again acquire a full-resolution image, as in interval 404. Thus, interval 416 may represent the start of another cycle similar to that of intervals 404-414. Notably, at interval 404 the image processor may be configured to process ROI images captured during a preceding cycle (not shown).

Notably, the amount of time for each interval and the number of ROI images captured for each full-resolution image may vary. For example, some tasks may necessitate the capture of more ROI images than shown (e.g., 16 ROI images per full-resolution image), or fewer ROI images (e.g. 4 ROI images per full-resolution image). Further, the size of each ROI and/or the amount of ADCs provided for the image sensor, among other factors, may dictate the length of the intervals during which ROI images are captured.

VIII. Additional Example Operations

FIG. 5 illustrates a flow chart of operations related to acquiring ROI images. The operations may be carried out by image sensor 100, image sensor 200, the components thereof, and/or the circuitry associated therewith, among other possibilities. However, the operations can also be carried out by other types of devices or device subsystems. For example, the process could be carried out by a server device, an autonomous vehicle, and/or a robotic device.

The embodiments of FIG. 5 may be simplified by the removal of any one or more of the features shown therein. Further, these embodiments may be combined with features, aspects, and/or implementations of any of the previous figures or otherwise described herein.

Block 500 may involve obtaining, from an image sensor comprising a plurality of pixels that form a plurality of ROIs, a full-resolution image of an environment. The full-resolution image may contain each respective ROI of the plurality of ROIs. Each respective ROI of the plurality of ROIs may be associated with a respective ADC bank of a plurality of ADC banks. Each respective multiplexer of a plurality of multiplexers may be electrically connected to (i) a corresponding ADC bank of the plurality of ADC banks and (ii) a corresponding subset of the plurality of ROIs. The respective multiplexer may be configured to electrically connect the corresponding ADC bank to a selected ROI of the subset. Obtaining the full-resolution image may include electrically connecting, by way of the plurality of multiplexers, each respective ADC bank to the associated respective ROI.

Block 502 may involve selecting a particular ROI based on the full-resolution image.

Block 504 may involve obtaining, from the image sensor, a plurality of ROI images of the particular ROI instead of obtaining an additional full-resolution image by (i) electrically connecting, to the particular ROI and by way of the respective multiplexers, a first ADC bank associated with the particular ROI and a second ADC bank associated with another ROI of the plurality of ROIs and (ii) digitizing pixels of the particular ROI by way of parallel operation of the first ADC bank and the second ADC bank.

In some embodiments, obtaining the full-resolution image may include digitizing a particular column of each respective ROI by way of the plurality of ADC banks each operating in parallel. Obtaining the plurality of ROI images may involve (i) digitizing a first column of the particular ROI by way of the first ADC bank in parallel with (ii) digitizing a second column of the particular ROI by way of the second ADC.

In some embodiments, each respective multiplexer of the plurality of multiplexers may include (i) an ROI multiplexer configured to select among ROIs of the subset and, (ii) for each respective ROI of the ROIs of the subset, a column multiplexer electrically connected to the ROI multiplexer and configured to select among the columns of the respective ROI.

In some embodiments, the image sensor may include, for each respective pixel that forms the particular ROI, (i) a first enable transistor configured to electrically connect a first pixel output line to the respective pixel to provide an output of the respective pixel to the first ADC bank, (ii) a first column select line configured to control the first enable transistor to electrically connect the respective pixel to the first pixel output line, (iii) a second enable transistor configured to electrically connect a second pixel output line to the respective pixel to provide an output of the respective pixel to the second ADC bank, and (iv) a second column select line configured to control the second enable transistor to electrically connect the respective pixel to the second pixel output line.

In some embodiments, the first pixel output line may be shared by a plurality of pixels of a row containing the respective pixel, and the second pixel output line may be shared by the plurality of pixels of the row containing the respective pixel.

In some embodiments, obtaining the full-resolution image may include digitizing a particular row of each respective ROI by way of the plurality of ADC banks each operating in parallel. Obtaining the plurality of ROI images may include (i) digitizing a first row of the particular ROI by way of the first ADC bank in parallel with (ii) digitizing a second row of the particular ROI by way of the second ADC.

In some embodiments, the full-resolution image may be obtained at a first frame rate and the plurality of ROI images may be obtained at a second frame rate higher than the first frame rate.

In some embodiments, the second ADC bank associated with the another ROI may include two or more ADC banks associated with two or more other ROIs of the plurality of ROIs. Thus, the second frame rate may be proportional to a number of the two or more ADC banks.

In some embodiments, each respective ROI of the plurality of ROIs may be fixed with respect to the plurality of pixels. The respective ROI may be mutually exclusive of other ROIs of the plurality of ROIs.

In some embodiments, a subset of the plurality of pixels that defines a respective ROI of the plurality of ROIs may be modifiable by way of additional multiplexers such that at least one of a size of the respective ROI or a position of the respective ROI is reconfigurable.

In some embodiments, a distance between the image sensor and an object of interest represented within the full-resolution image may be compared to a threshold distance. Based on results of comparing the distance to the threshold distance, the plurality of ROI images may be obtained instead of obtaining the additional full-resolution image.

In some embodiments, a speed of an object of interest represented within the full-resolution image may be compared to a threshold speed. Based on results of comparing the speed to the threshold speed, the plurality of ROI images may be obtained instead of obtaining the additional full-resolution image.

In some embodiments, the plurality of ROIs may divide an area of the image sensor into two or more columns each comprising a plurality of rows.

In some embodiments, the plurality of ROIs may divide an area of the image sensor into one or more rows each comprising a plurality of columns.

In some embodiments, the control circuitry may include one or more layers of an integrated circuit. At least one layer of the integrated circuit may include at least one of the plurality of pixels of the image sensor, the plurality of ADC banks, or the plurality of multiplexers. The plurality of ROI images may be analyzed to determine one or more attributes of an object of interest represented thereby. The full-resolution image and the one or more attributes may be transmitted to a processor communicatively connected to the integrated circuit.

In some embodiments, the control circuitry may include (i) an integrated circuit and (ii) a processor communicatively connected to the integrated circuit. The integrated circuit may be configured to obtain the full-resolution image and the plurality of ROI images and transmit the full-resolution image and the plurality of ROI images to the processor. The processor may be configured to select the particular ROI and analyze the plurality of ROI images to determine one or more attributes of an object of interest represented thereby.

In some embodiments, the plurality of ROI images may be analyzed to determine one or more attributes of an object of interest represented thereby. The one or more attributes may include one or more of: (i) geometric properties of the object of interest, (ii) position of the object of interest within the environment, (iii) speed of the object of interest, (iv) optical flow associated with the object of interest, (v) a classification of the object of interest, or (vi) one or more confidence values associated with results of the analyzing of the plurality of ROI images.

In some embodiments, the control circuitry may implement an artificial neural network configured to select the particular ROI by (i) detecting an object of interest within the full-resolution image and (ii) determining the particular ROI that corresponds to a position of the object of interest within the full-resolution image.

In some embodiments, the control circuitry may be configured to switch between operating in one of three different modes based on conditions within the environment. A first mode of the three different modes may involve obtaining a first plurality of full-resolution images at a first frame rate. A second mode of the three different modes may involve alternating between obtaining the full-resolution image at the first frame rate and obtaining the plurality of ROI images at a second frame rate higher than the first frame rate. A third mode of the three different modes may involve (i) obtaining a second plurality of full-resolution images at a third frame rate higher than the first frame rate and (ii) combining the second plurality of full-resolution images to generate a stacked full-resolution image.

IX. Conclusion

The present disclosure is not to be limited in terms of the particular embodiments described in this application, which are intended as illustrations of various aspects. Many modifications and variations can be made without departing from its scope, as will be apparent to those skilled in the art. Functionally equivalent methods and apparatuses within the scope of the disclosure, in addition to those described herein, will be apparent to those skilled in the art from the foregoing descriptions. Such modifications and variations are intended to fall within the scope of the appended claims.

The above detailed description describes various features and operations of the disclosed systems, devices, and methods with reference to the accompanying figures. In the figures, similar symbols typically identify similar components, unless context dictates otherwise. The example embodiments described herein and in the figures are not meant to be limiting. Other embodiments can be utilized, and other changes can be made, without departing from the scope of the subject matter presented herein. It will be readily understood that the aspects of the present disclosure, as generally described herein, and illustrated in the figures, can be arranged, substituted, combined, separated, and designed in a wide variety of different configurations.

With respect to any or all of the message flow diagrams, scenarios, and flow charts in the figures and as discussed herein, each step, block, and/or communication can represent a processing of information and/or a transmission of information in accordance with example embodiments. Alternative embodiments are included within the scope of these example embodiments. In these alternative embodiments, for example, operations described as steps, blocks, transmissions, communications, requests, responses, and/or messages can be executed out of order from that shown or discussed, including substantially concurrently or in reverse order, depending on the functionality involved. Further, more or fewer blocks and/or operations can be used with any of the message flow diagrams, scenarios, and flow charts discussed herein, and these message flow diagrams, scenarios, and flow charts can be combined with one another, in part or in whole.

A step or block that represents a processing of information may correspond to circuitry that can be configured to perform the specific logical functions of a herein-described method or technique. Alternatively or additionally, a block that represents a processing of information may correspond to a module, a segment, or a portion of program code (including related data). The program code may include one or more instructions executable by a processor for implementing specific logical operations or actions in the method or technique. The program code and/or related data may be stored on any type of computer readable medium such as a storage device including random access memory (RAM), a disk drive, a solid state drive, or another storage medium.

The computer readable medium may also include non-transitory computer readable media such as computer readable media that store data for short periods of time like register memory, processor cache, and RAM. The computer readable media may also include non-transitory computer readable media that store program code and/or data for longer periods of time. Thus, the computer readable media may include secondary or persistent long term storage, like read only memory (ROM), optical or magnetic disks, solid state drives, compact-disc read only memory (CD-ROM), for example. The computer readable media may also be any other volatile or non-volatile storage systems. A computer readable medium may be considered a computer readable storage medium, for example, or a tangible storage device.

Moreover, a step or block that represents one or more information transmissions may correspond to information transmissions between software and/or hardware modules in the same physical device. However, other information transmissions may be between software modules and/or hardware modules in different physical devices.

The particular arrangements shown in the figures should not be viewed as limiting. It should be understood that other embodiments can include more or less of each element shown in a given figure. Further, some of the illustrated elements can be combined or omitted. Yet further, an example embodiment can include elements that are not illustrated in the figures.

While various aspects and embodiments have been disclosed herein, other aspects and embodiments will be apparent to those skilled in the art. The various aspects and embodiments disclosed herein are for purpose of illustration and are not intended to be limiting, with the true scope being indicated by the following claims.

What is claimed is:

1. An apparatus comprising:
   an image sensor comprising a plurality of pixels that form a plurality of regions of interest (ROIs);
   a plurality of analog-to-digital converter (ADC) banks;
   a plurality of multiplexers, wherein each respective multiplexer of the plurality of multiplexers is configured to electrically connect (i) a corresponding ADC bank of the plurality of ADC banks to (ii) a selected ROI of the plurality of ROIs; and
   control circuitry configured to perform operations comprising:
      selecting a particular ROI of the plurality of ROIs;
      electrically connecting, to the particular ROI, (i) a first ADC bank by way of a first multiplexer corresponding to the first ADC bank and (ii) a second ADC bank by way of a second multiplexer corresponding to the second ADC bank; and
      generating an ROI image by digitizing pixels of the particular ROI by way of parallel operation of the first ADC bank and the second ADC bank.

2. The apparatus of claim 1, wherein each respective ADC bank of the plurality of ADC banks is associated with a respective ROI of the plurality of ROIs such that the respective ADC bank is configured to digitize pixels of the respective ROI when the image sensor is used to generate a full-resolution image that includes the plurality of ROIs, wherein the first ADC bank is associated with the particular ROI, and wherein the second ADC bank is associated with another ROI of the plurality of ROIs.

3. The apparatus of claim 1, wherein the operations further comprise:
   obtaining, from the image sensor, a full-resolution image by electrically connecting, by way of the plurality of multiplexers, the plurality of ADC banks to the plurality of ROIs, wherein the particular ROI is selected based on the full-resolution image, and wherein the ROI image is generated instead of an additional full-resolution image.

4. The apparatus of claim 3, wherein the full-resolution image is obtained by digitizing a respective column or a respective row of each respective ROI by way of the plurality of ADC banks each operating in parallel, and wherein the ROI image is obtained by (i) digitizing a first column or a first row of the particular ROI by way of the first ADC bank in parallel with (ii) digitizing a second column or a second row of the particular ROI by way of the second ADC.

5. The apparatus of claim 3, wherein the full-resolution image is obtained at a first frame rate, and wherein the ROI image is obtained at a second frame rate higher than the first frame rate, wherein the second ADC bank comprises two or more ADC banks, and wherein the second frame rate is proportional to a number of the two or more ADC banks.

6. The apparatus of claim 1, wherein each respective multiplexer of the plurality of multiplexers is configured to electrically connect (i) the corresponding ADC bank to (ii) a corresponding subset of the plurality of ROIs.

7. The apparatus of claim 1, wherein each respective multiplexer of the plurality of multiplexers comprises:
   an ROI multiplexer configured to select among the plurality of ROIs; and
   for each respective ROI of the plurality of ROIs, an additional multiplexer electrically connected to the ROI multiplexer and configured to select among columns or rows of the respective ROI.

8. The apparatus of claim 1, wherein the image sensor comprises, for each respective pixel that forms the particular ROI:
   a first enable transistor configured to electrically connect a first pixel output line to the respective pixel to provide an output of the respective pixel to the first multiplexer;
   a first select line configured to control the first enable transistor to electrically connect the respective pixel to the first pixel output line;
   a second enable transistor configured to electrically connect a second pixel output line to the respective pixel to provide an output of the respective pixel to the second multiplexer; and
   a second select line configured to control the second enable transistor to electrically connect the respective pixel to the second pixel output line.

9. The apparatus of claim 1, wherein each respective ROI of the plurality of ROIs is fixed with respect to the plurality of pixels, and wherein the respective ROI is mutually exclusive of other ROIs of the plurality of ROIs.

10. The apparatus of claim 1, wherein a subset of the plurality of pixels that defines a respective ROI of the plurality of ROIs is modifiable such that at least one of: (i) a size of the respective ROI or (ii) a position of the respective ROI, is reconfigurable.

11. The apparatus of claim 1, wherein the operations further comprise:
   performing a comparison of an attribute of an object of interest to a threshold attribute value; and
   based on results of the comparison, determining to generate the ROI image.

12. The apparatus of claim 1, wherein the plurality of ROIs divide an area of the image sensor into (i) two or more columns each comprising a plurality of rows or (ii) one or more rows each comprising a plurality of columns.

13. The apparatus of claim 1, wherein the control circuitry is provided in a first layer of an integrated circuit, wherein at least a second layer of the integrated circuit comprises at least one of the plurality of pixels of the image sensor, the plurality of ADC banks, or the plurality of multiplexers, and wherein the operations further comprise:
   analyzing the ROI image to determine one or more attributes of an object of interest represented thereby; and
   transmitting the one or more attributes to a processor communicatively connected to the integrated circuit.

14. The apparatus of claim 1, wherein the control circuitry comprises (i) an integrated circuit and (ii) a processor communicatively connected to the integrated circuit, wherein the integrated circuit is configured to transmit the ROI image to the processor, and wherein the processor is configured to select the particular ROI and analyze the ROI image to determine one or more attributes of an object of interest represented thereby.

15. The apparatus of claim 1, wherein the operations further comprise:
   analyzing the ROI image to determine one or more attributes of an object of interest represented thereby, wherein the one or more attributes comprise one or more of: (i) geometric properties of the object of interest, (ii) position of the object of interest within an environment, (iii) speed of the object of interest, (iv) optical flow associated with the object of interest, (v) a classification of the object of interest, or (vi) one or more confidence values associated with results of the analyzing of the ROI image.

16. The apparatus of claim 1, wherein the control circuitry implements an artificial neural network configured to detect an object of interest within image data generated by the image sensor, wherein the particular ROI is selected based on a position of the object of interest within the image data.

17. A method comprising:
selecting a particular region of interest (ROI) of a plurality of ROIs of an image sensor comprising a plurality of pixels that form the plurality of ROIs, wherein each respective multiplexer of a plurality of multiplexers is configured to electrically connect (i) a corresponding analog-to-digital converter (ADC) bank of a plurality of ADC banks to (ii) a selected ROI of the plurality of ROIs;
electrically connecting, to the particular ROI, (i) a first ADC bank by way of a first multiplexer corresponding to the first ADC bank and (ii) a second ADC bank by way of a second multiplexer corresponding to the second ADC bank; and
generating an ROI image by digitizing pixels of the particular ROI by way of parallel operation of the first ADC bank and the second ADC bank.

18. The method of claim 17, further comprising:
obtaining, from the image sensor, a full-resolution image by electrically connecting, by way of the plurality of multiplexers, the plurality of ADC banks to the plurality of ROIs, wherein the particular ROI is selected based on the full-resolution image, and wherein the ROI image is generated instead of an additional full-resolution image.

19. The method of claim 18, wherein the full-resolution image is obtained by digitizing a respective column or a respective row of each respective ROI by way of the plurality of ADC banks each operating in parallel, and wherein the ROI image is obtained by (i) digitizing a first column or a first row of the particular ROI by way of the first ADC bank in parallel with (ii) digitizing a second column or a second row of the particular ROI by way of the second ADC.

20. A non-transitory computer readable storage medium having stored thereon instructions that, when executed by a computing device, cause the computing device to perform operations comprising:
selecting a particular region of interest (ROI) of a plurality of ROIs of an image sensor comprising a plurality of pixels that form the plurality of ROIs, wherein each respective multiplexer of a plurality of multiplexers is configured to electrically connect (i) a corresponding analog-to-digital converter (ADC) bank of a plurality of ADC banks to (ii) a selected ROI of the plurality of ROIs;
electrically connecting, to the particular ROI, (i) a first ADC bank by way of a first multiplexer corresponding to the first ADC bank and (ii) a second ADC bank by way of a second multiplexer corresponding to the second ADC bank; and
generating an ROI image by digitizing pixels of the particular ROI by way of parallel operation of the first ADC bank and the second ADC bank.

* * * * *